(12) United States Patent
Nicholas et al.

(10) Patent No.: US 11,093,016 B2
(45) Date of Patent: Aug. 17, 2021

(54) PORTABLE PLAYBACK DEVICE POWER MANAGEMENT

(71) Applicant: Sonos, Inc., Santa Barbara, CA (US)

(72) Inventors: Joshua Nicholas, Waltham, MA (US); Brenda Stefani, Andover, MA (US); Liang Chai, Acton, MA (US); Xiang Wang, Braintree, MA (US); Allan Velzy, Needham, MA (US); Edwin Joseph Fitzpatrick, III, Boston, MA (US); Hrishikesh Gossain, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 235 days.

(21) Appl. No.: 16/435,214

(22) Filed: Jun. 7, 2019

(65) Prior Publication Data

US 2020/0387209 A1 Dec. 10, 2020

(51) Int. Cl.
| | | |
|---|---|---|
| *G06F 1/26* | (2006.01) | |
| *G06F 1/32* | (2019.01) | |
| *G06F 1/3228* | (2019.01) | |
| *G06F 1/324* | (2019.01) | |
| *G06F 1/3293* | (2019.01) | |

(52) U.S. Cl.
CPC ............ *G06F 1/3228* (2013.01); *G06F 1/324* (2013.01); *G06F 1/3293* (2013.01)

(58) Field of Classification Search
CPC ...... G06F 1/324; G06F 1/3228; G06F 1/3243; G06F 1/3293; G06F 1/3296; G06F 9/54; Y02D 10/00; Y02D 30/50
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Nitin C Patel
(74) *Attorney, Agent, or Firm* — Akerman LLP

(57) ABSTRACT

Example techniques related to portable playback device power management. An example implementation involves launching a power coordinator background process, the power coordinator background process having multiple client programs and establishing respective inter-process communication (IPC) mechanisms between the multiple client programs and the power coordinator background process. The implementation further involves receiving, via the established IPC mechanisms from the multiple client programs, messages indicating that the respective client program is ready to suspend, and determining that each client program of the multiple client programs is ready to suspend. The implementation further includes sending instructions to the operating system to kernel suspend. While in kernel suspend, the playback device detects a particular trigger to kernel resume and in response, performs a kernel resume.

19 Claims, 29 Drawing Sheets

(56) References Cited

U.S. PATENT DOCUMENTS

| | | | |
|---|---|---|---|
| 6,032,202 | A | 2/2000 | Lea et al. |
| 6,256,554 | B1 | 7/2001 | Dilorenzo |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang et al. |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0142944 | A1 | 6/2007 | Goldberg et al. |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control;" Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

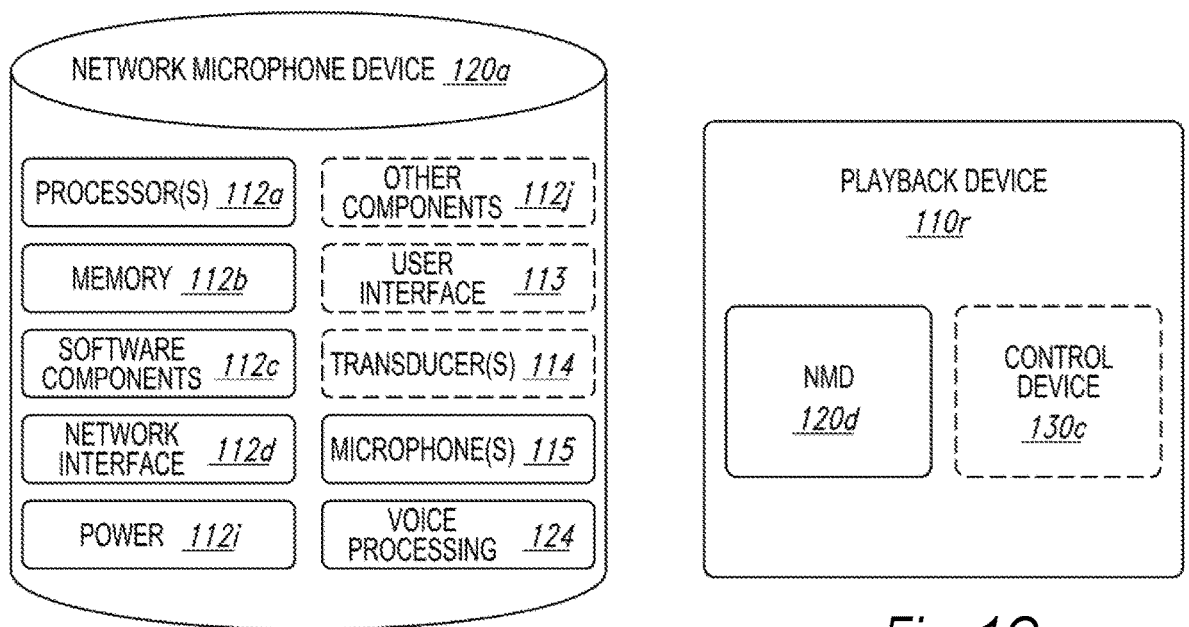
Fig. 1F
Fig. 1G
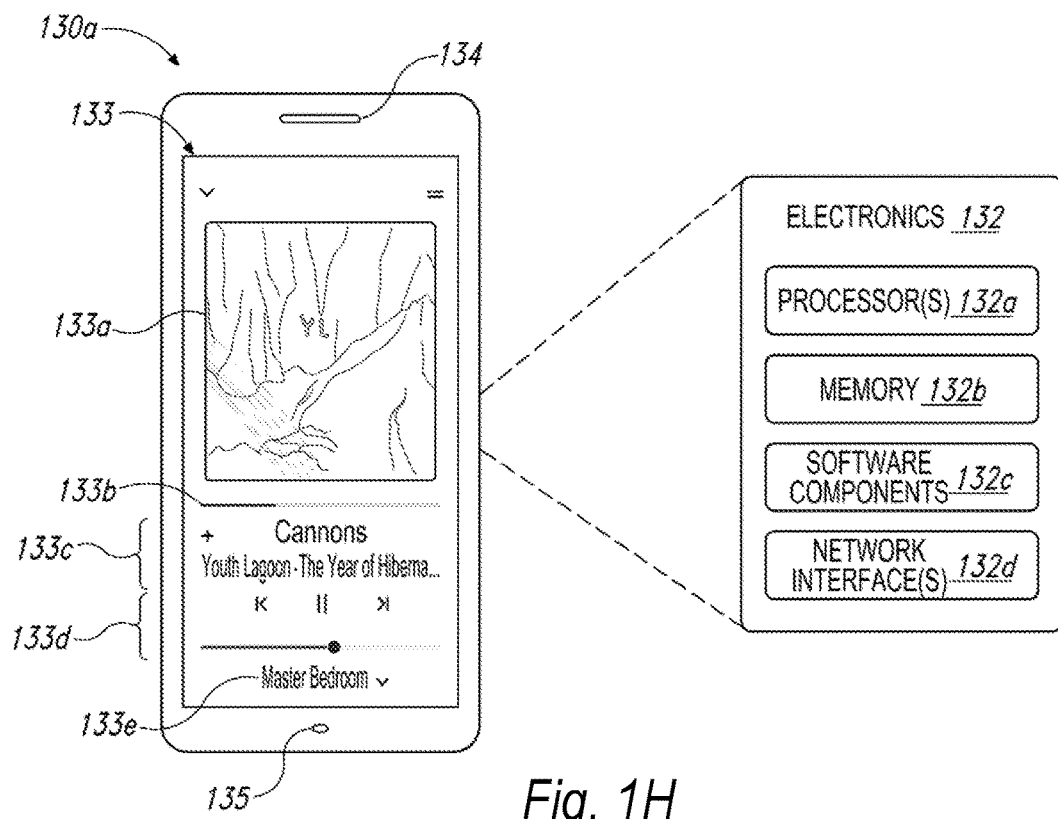
Fig. 1H

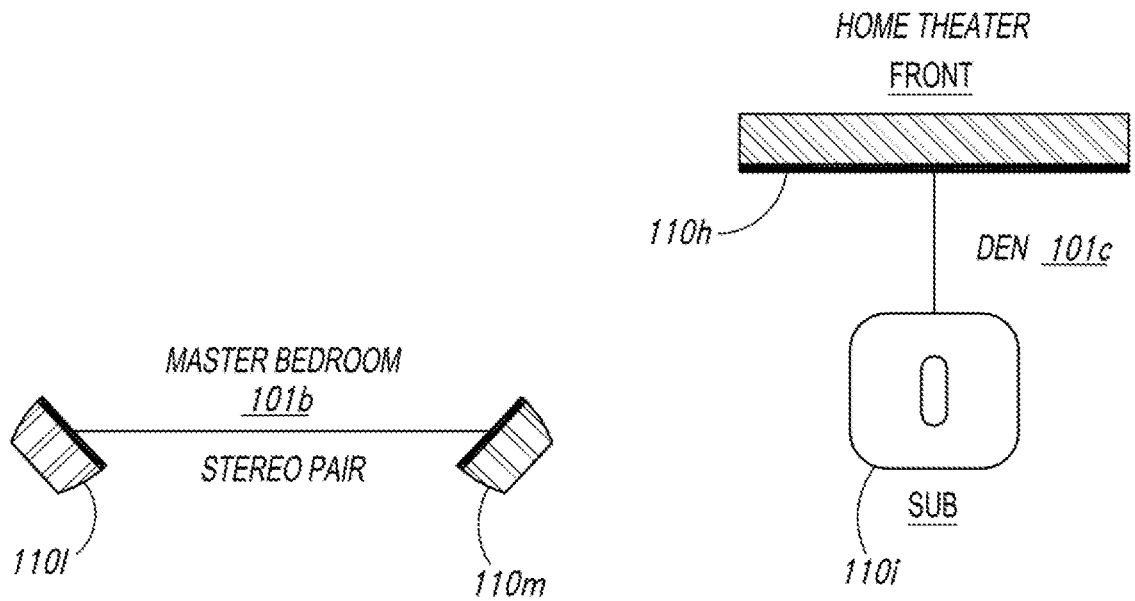
Fig. 1I
Fig. 1J
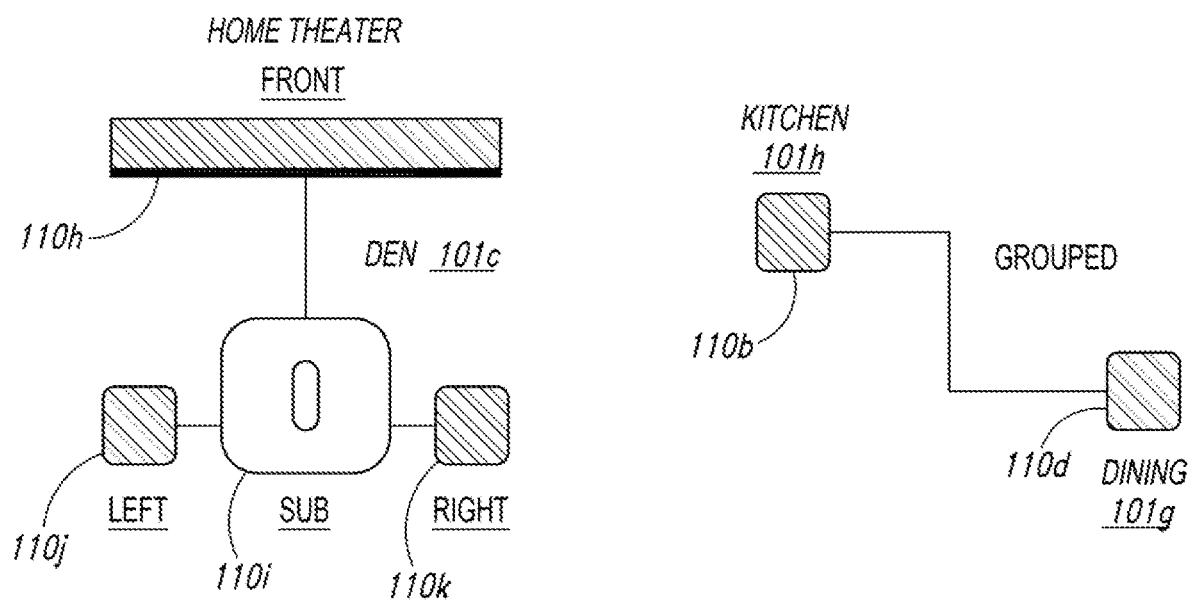
Fig. 1K
Fig. 1L

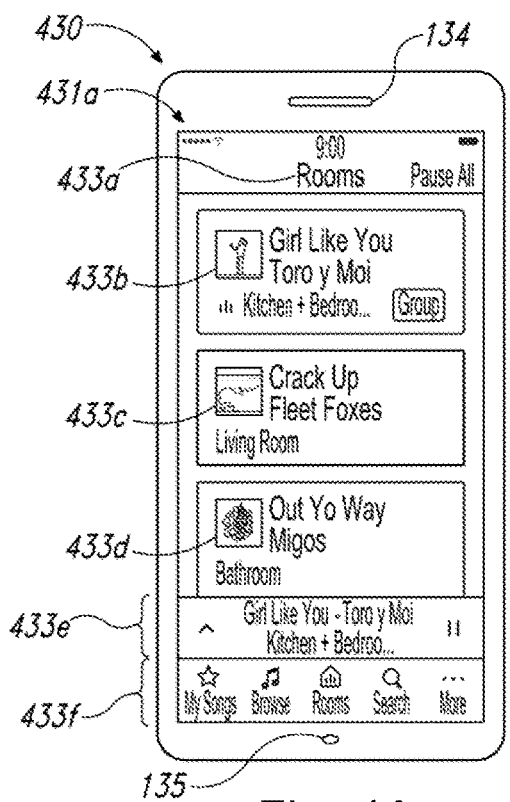
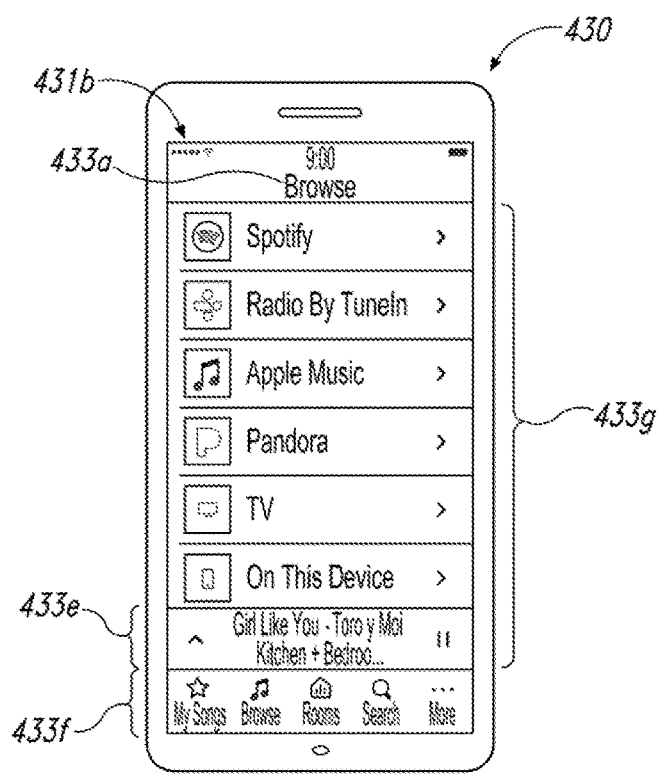
Fig. 4A
Fig. 4B
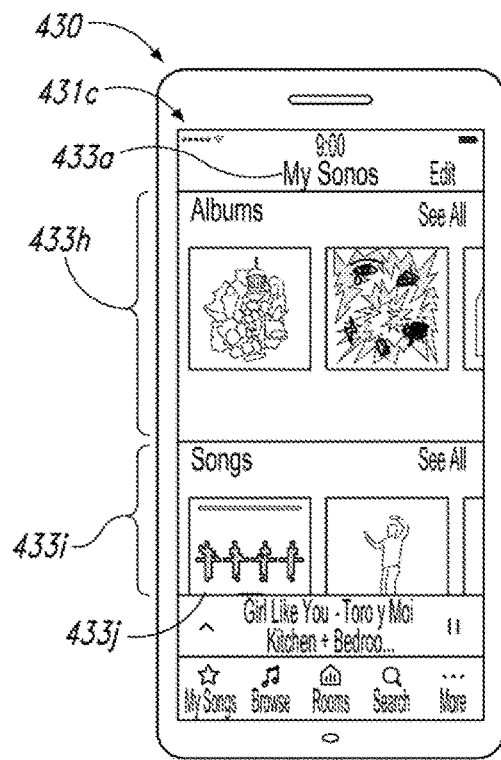
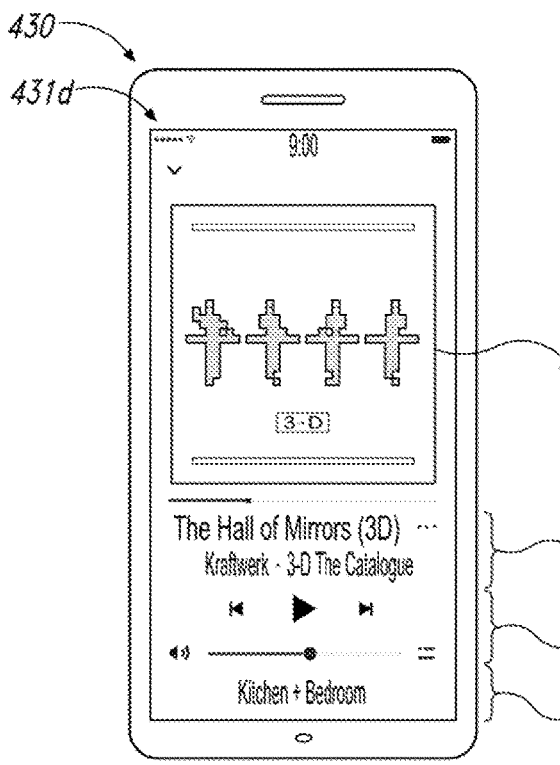
Fig. 4C
Fig. 4D

Fig. 7G

| Power Level | First Power Level | Second Power Level | Third Power Level | Fourth Power Level | Fifth Power Level |
|---|---|---|---|---|---|
| Main Processor Cores of Processors 312a | All Cores Enabled | Half Cores Enabled / Half Cores Disabled | One Core Enabled | One Core Enabled | No Cores Enabled |
| Main Processor Frequency | Max Frequency | 50% Frequency | 50% Frequency | Minimum Frequency | Minimum Frequency |
| Voltage Rails | All Enabled | All Enabled | 12 V Disabled / 5 V Enabled / 3.3 V Enabled | 12 V Disabled / 5 V Enabled / 3.3 V Enabled | 12 V Disabled / 5 V Disabled / 3.3 V Enabled |
| Auxiliary Processor | Enabled | Enabled | Enabled | Enabled | Enabled |
| Network Interfaces 312g | Enabled | Enabled | Enabled | Enabled | Disabled |
| Audio Stage (Audio Processing Components 310g & Audio Amplifiers 310h | Enabled | Enabled | Disabled | Disabled | Disabled |

Fig. 10

| Power Mode | Dead Battery / Shipping | Off | Standby | Deep Sleep | Playback | Charging |
|---|---|---|---|---|---|---|
| Description | Battery Discharge Protection Switch Open; Transition to Off when charger connected | PBD 310 awaiting Button Press to Initiate BOOT to transition to Standby | PBD 310 has active wireless connection; no audio playing | PBD 310 awaiting Button Press to transition to Standby | PBD 310 is active and playing audio; transitions to Standby when audio stops | PBD 310 operates in zone; transitions to Standby when charger disconnected |
| Timing Requirements | No Timers | No Timers | Transitions to Deep Sleep after 20-30 minutes of uninterrupted Standby | Transitions to Off after 2-4 hours of uninterrupted Deep Sleep | No Timers | No Timers |
| Wi-Fi Chipset 887 | Off | Off | Active | Wake from Interrupt | Active | Active |
| 802.15 Chipset | Off | Off | Standby | Wake from Interrupt | Active | Active |
| PSoC 882 (BTLE 882b) | Off | Off | Active | Active | Active | Active |
| PSoC 882 (CapTouch 882a) | Off | Off | Active | Wake from Interrupt | Active | Active |
| Main Processor(s) 881a | Off | Off | Standby | Suspend | Active | Active |
| Auxiliary Processor 881a | Off | Off | Active | Active | Active | Active |
| Voice | Off | Off | Low Power | Wake from Interrupt | Low Power | Active |
| PM uC 883 | Off | Active | Active | Active | Active | Active |

PORTABLE PLAYBACK DEVICE POWER MANAGEMENT

CROSS-REFERENCE TO RELATED APPLICATIONS

This application is related to U.S. non-provisional patent application Ser. No. 16/435,235, filed on Jun. 7, 2019, entitled "Portable Playback Device Power Management," with Attorney Docket No. 19-0307 (MBHB 19-898), which is incorporated herein by reference in its entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIGS. 1-I, 1J, 1K, and 1L are schematic diagrams of corresponding media playback system zones.

FIGS. 4A, 4B, 4C, and 4D are schematic diagrams of a control device in various stages of operation in accordance with aspects of the disclosed technology.

FIG. 7G is a table illustrating example power levels in accordance with aspects of the disclosed technology.

FIG. 10 is a table illustrating example power modes in accordance with aspects of the disclosed technology.

Figure 1A:
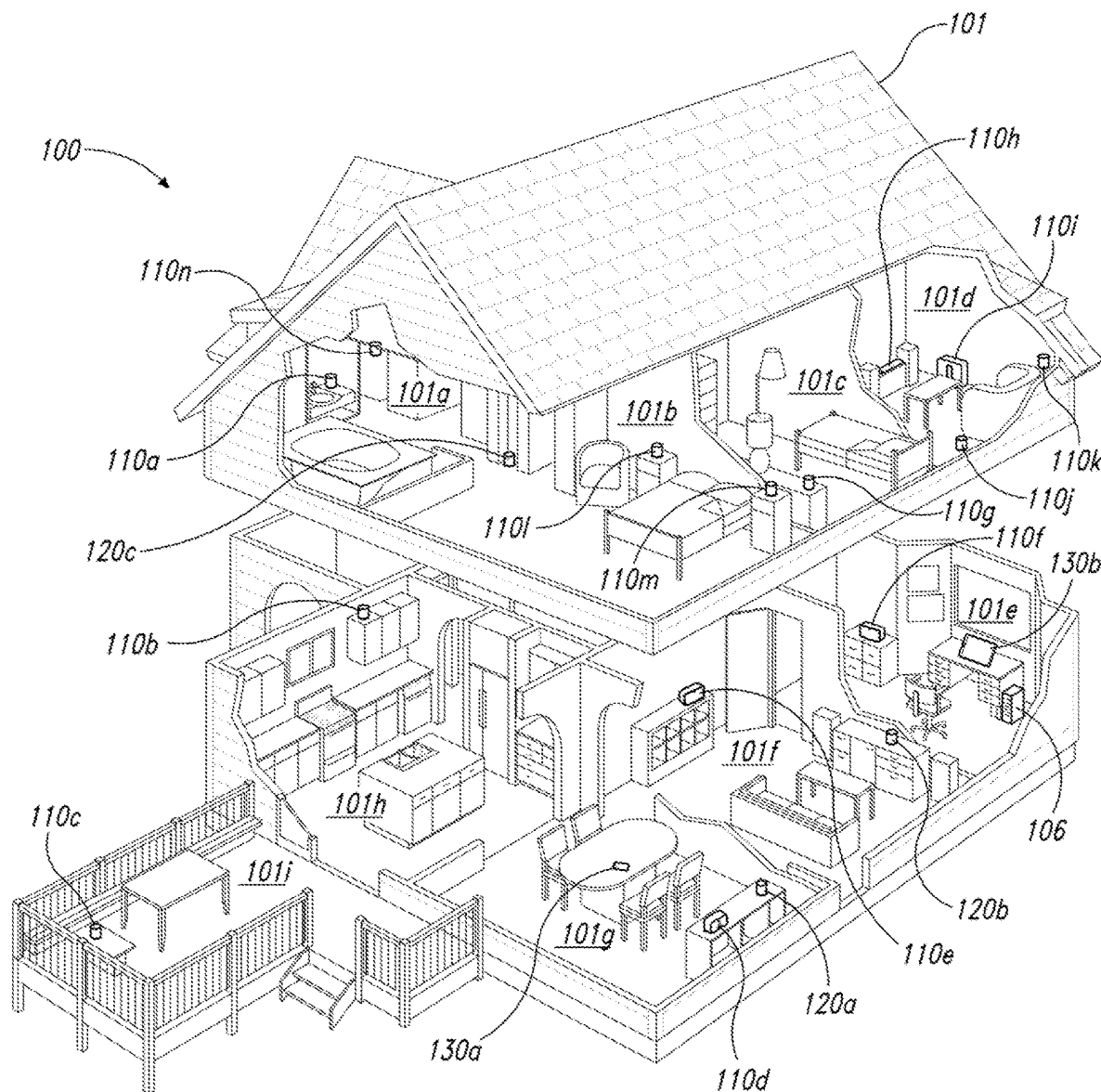
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Example techniques described herein involve power management techniques for portable playback devices. Example portable playback devices described herein include one or more speakers and audio amplifiers powerful enough to facilitate out loud audio playback at suitable volume levels in both exterior and interior environments. To maintain portability, these example playback devices include one or more batteries to power the portable playback device during audio playback when disconnected from AC power.

A challenge arising with such portable playback devices is maintaining a balance between audio output capabilities, battery life, and portability. Powering large enough speaker drivers and associated amplifiers to facilitate out loud audio playback at suitable volumes in exterior or large environments requires large capacity batteries or portable battery life will be undesirably brief. At the same time, increasing battery life by adding battery capacity adds undesirable weight and bulk to the portable playback devices.

In contrast to portable general purpose computing devices such as smartphones, tablets, and laptop computers, a portable playback device may support relatively few features. Example portable playback devices may support only audio playback and related functions (e.g., voice control) rather than be generally programmable with user-installed software (e.g., apps on a smartphone or tablet). Given the predictable range of functionality, the portable playback device may coordinate between programs responsible for various functions (e.g., audio playback, network connectivity, software upgrades) of the portable playback device to manage power use by the portable playback device, especially while disconnected from AC power.

Example portable playback devices may implement a power coordinator that coordinates between one or more client programs and the operating system (kernel) to determine when to suspend. Example suspend modes (referred to herein as kernel suspend) involve disabling the main processor(s) of the portable playback device, which suspends the kernel and userspace programs. In this mode, power use is drastically reduced as compared with normal (playback) mode. At the same time, time to resume playback from kernel suspend is drastically less than when the portable playback device is powered off, as the kernel and userspace programs do not need to be reloaded into memory during boot.

In an example, the power coordinator implemented as a background process and launched by the kernel during boot. After launching, the power coordinator establishes respective inter-process communication (IPC) mechanisms between multiple client programs and the power coordinator. These IPC mechanisms allow the client programs (responsible for various functionality of the portable playback device) to communicate whether they are ready to suspend and if so, the time at which they need to resume.

Accordingly, in operation, the power coordinator receives, via the established IPC mechanisms from the multiple client programs, messages indicating that the respective client program is ready to suspend. Such messages may also indicate respective resume times for the various clients programs. Via these messages, the power coordinator monitors the respective ready (or not ready) to suspend states of the multiple client programs. When each client program of the multiple client programs is ready to suspend, the power coordinator sends instructions to the operating system to kernel suspend. The power coordinator may also set a kernel suspend timeout trigger to the earliest resume time among the resume times indicated in the received messages from the multiple client program so that the kernel is resumed at an appropriate time for all client programs.

While the power coordinator may coordinate suspend from userspace, the power coordinator is unable to resume the portable playback device from suspend, as userspace programs like the power coordinator and the client programs not executing during kernel suspend. Moreover, support for resuming the portable playback device on any of a number of different triggers, such as wake-on-button (e.g., a power button, to facilitate the user requesting a resume), wake-on-battery (e.g., based on a fault or change in status), wake-on-Bluetooth, wake-on-wireless, and/or wake-on-touch, may be desirable. To facilitate these multiple resume triggers, example portable playback devices may implement one or more secondary controllers (e.g., microcontrollers and/or system-on-chip) that monitor for the appropriate conditions corresponding to each resume trigger and cause the main processor(s) and kernel to resume in response to these resume triggers.

For instance, an example playback device may implement a power manager in firmware on a power management microcontroller. The power manager may monitor the battery for various conditions relating to wake-on-battery triggers, such as a battery fault (e.g., overheating), critical battery level, and/or battery charging status changed. Upon detecting one of these wake-on-battery triggers, the power manager causes the power management microcontroller to send an interrupt to wake up the main processor(s) and the kernel.

In another example, the example playback device may implement a Bluetooth Low Energy (BLE) kernel driver in a secondary SoC, which stays active during kernel resume. The BLE driver monitors the BLE interface for a successful BLE connection, which corresponds to a wake-on-BLE trigger. Upon detecting the wake-on-BLE trigger, the BLE kernel driver causes the secondary SoC to send an interrupt to wake up the main processor(s) and the kernel.

Since the power coordinator is not executing when the interrupt is received, the power coordinator is unable to determine the source of the kernel resume trigger. In example implementations, the kernel implements a power event queue to communicate with the power coordinator. During a kernel resume based on a given kernel resume trigger, the kernel adds a kernel resume event to the power event indicating the source of the kernel resume trigger.

When the power coordinator resumes, the power coordinator reads the power event queue to determine the source of the kernel resume trigger. The power coordinator shares this information with the client programs, which allows the client programs to take action or change behavior based on the source of the kernel resume trigger. For instance, if the source of the kernel resume trigger is wake-on-BLE, a client program responsible for audio playback may change the audio content source of the portable playback device to a BLE audio stream from the successful BLE connection that triggered the wake-on-BLE. Other examples are possible as well.

As described above, the portable playback device, via the power coordinator, gains consensus from the multiple client programs that they are each ready to suspend before suspending. At the same time, the portable playback device resumes quickly from a variety of resume triggers. In other words, the portable playback device is slow to suspend, but quick to wake up.

The power coordinator may use a similar technique to manage power level of the portable playback device. A "power level" refers to a specific configuration of settings that when set, results in a given hardware performance for a particular power cost. Example portable playback devices may support multiple power levels and transition between power levels in an attempt to match current functions of the portable playback device to the most efficient power level.

In an example, in operation the multiple client programs determine their respective minimum power level. The client programs send messages indicating their respective power level requirements to the power coordinator via the established IPC mechanisms. The power coordinator monitors these messages, and determines a particular power level from among the multiple power levels, the particular power level being the highest power level among the respective power level requirements of the multiple client programs. The power coordinator then sends instructions to the operating system to operate at the particular power level. When the power coordinator detects that at least one client program requires a higher power level, the power coordinator instructs the kernel to increase the power level to support the requirements of this client program.

Example techniques related to portable playback device power management. An example implementation includes: launching a power coordinator background process, the power coordinator background process having multiple client programs; establishing respective inter-process communication (IPC) mechanisms between the multiple client programs and the power coordinator background process; receiving, via the established IPC mechanisms from the multiple client programs, messages indicating (a) that the respective client program is ready to suspend and (b) a respective resume time; determining, based on the received messages from the multiple client programs, that each client program of the multiple client programs is ready to suspend; based on determining that each client program of the multiple client programs is ready to suspend, (i) sending instructions to the operating system to kernel suspend and (ii) setting a kernel suspend timeout trigger to the earliest resume time among the resume times indicated in the received messages from the multiple client programs; while in the kernel suspend, detecting a particular trigger to kernel resume from among a plurality of triggers to kernel resume, wherein the plurality of triggers to kernel resume comprise the kernel suspend timeout trigger; and in response to the detecting the particular trigger to kernel resume, performing a kernel resume.

Another example implementation includes a portable playback device comprising: a control interface comprising a power button and transport controls; one or more speakers; one or more amplifiers configured to drive the one or more speakers; a battery; communications interfaces comprising an IEEE 802.11-compatible network interface and an IEEE 802.15-compatible interface; a main system-on-chip (SoC) comprising one or more main processor cores, an auxiliary processor core configured to enable the one or more main processor cores upon receiving an interrupt, and a kernel that executes on the one or more main processor cores, wherein a kernel suspend of the kernel disables the one or more main processor cores; a power management microcontroller configured to perform functions comprising: during kernel suspend of the kernel, monitoring, via one or more sensors of the power management microcontroller, the battery for conditions corresponding to respective wake-on-battery triggers, wherein the wake-on-battery triggers comprise (i) a battery fault, (ii) a critical battery level, and (iii) battery charging initiated; detecting that the monitored conditions correspond to a particular wake-on-battery trigger; and in response to detecting that the monitored conditions correspond to particular wake-on-battery trigger, sending, to the auxiliary processor core, an interrupt corresponding to the particular wake-on-battery trigger, wherein the interrupt causes the auxiliary processor core to enable the one or more main processor cores and resume the kernel from kernel suspend; and a housing carrying the one or more speakers, the one or more amplifiers, the battery, the communications interfaces, the power management microcontroller, and the main SoC, wherein the kernel is configured to perform functions comprising: after resuming from kernel suspend, adding a first kernel resume source event to a power event queue, the first kernel resume source event indicating the particular wake-on-battery trigger, wherein a power coordinator background process is configured to read the first kernel resume source event from the power event queue and send data indicating the particular wake-on-battery trigger to one or more client programs via one or more inter-process communication (IPC) mechanisms.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110.

In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E and 1-I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
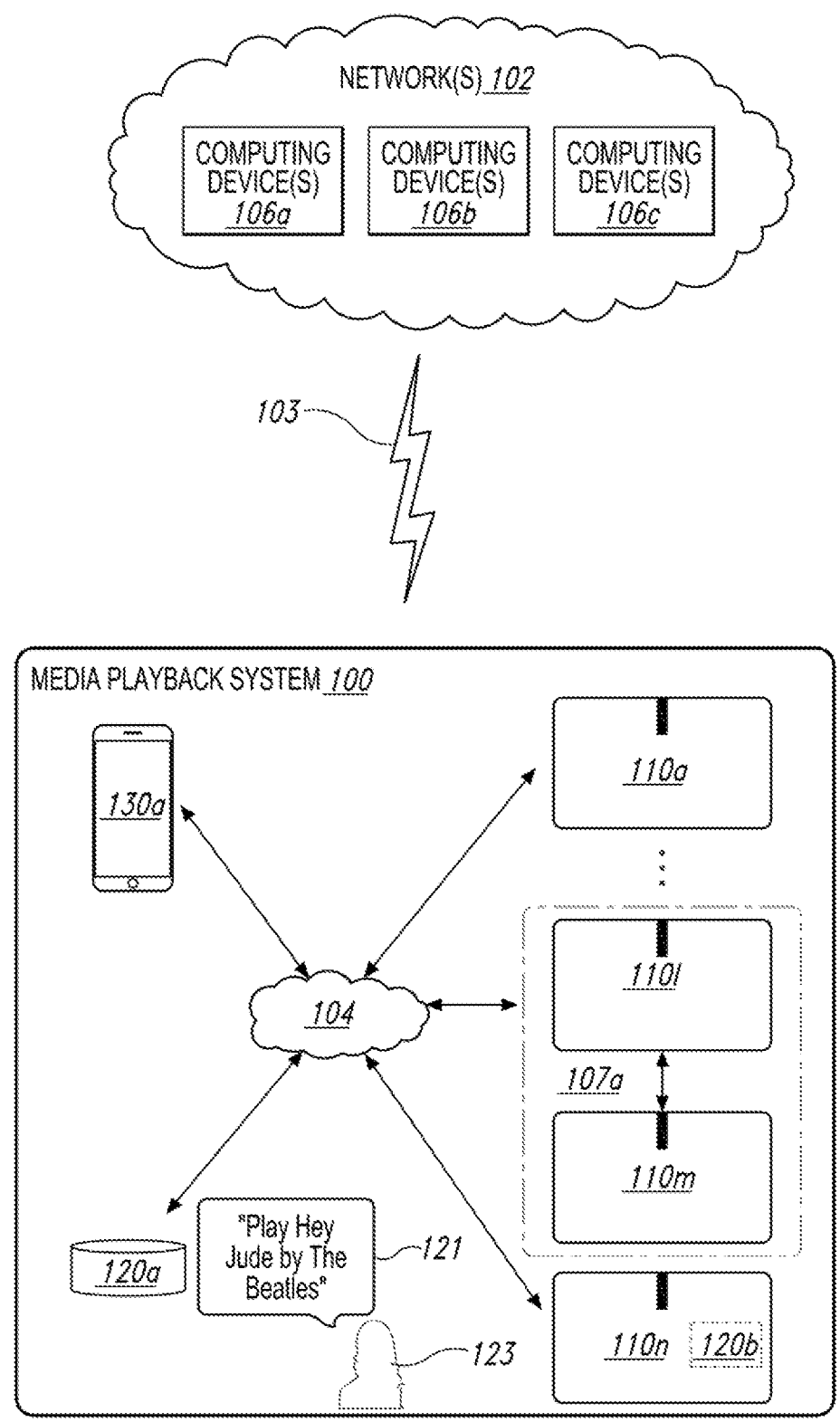
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a Wi-Fi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "Wi-Fi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household Wi-Fi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through 1M.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
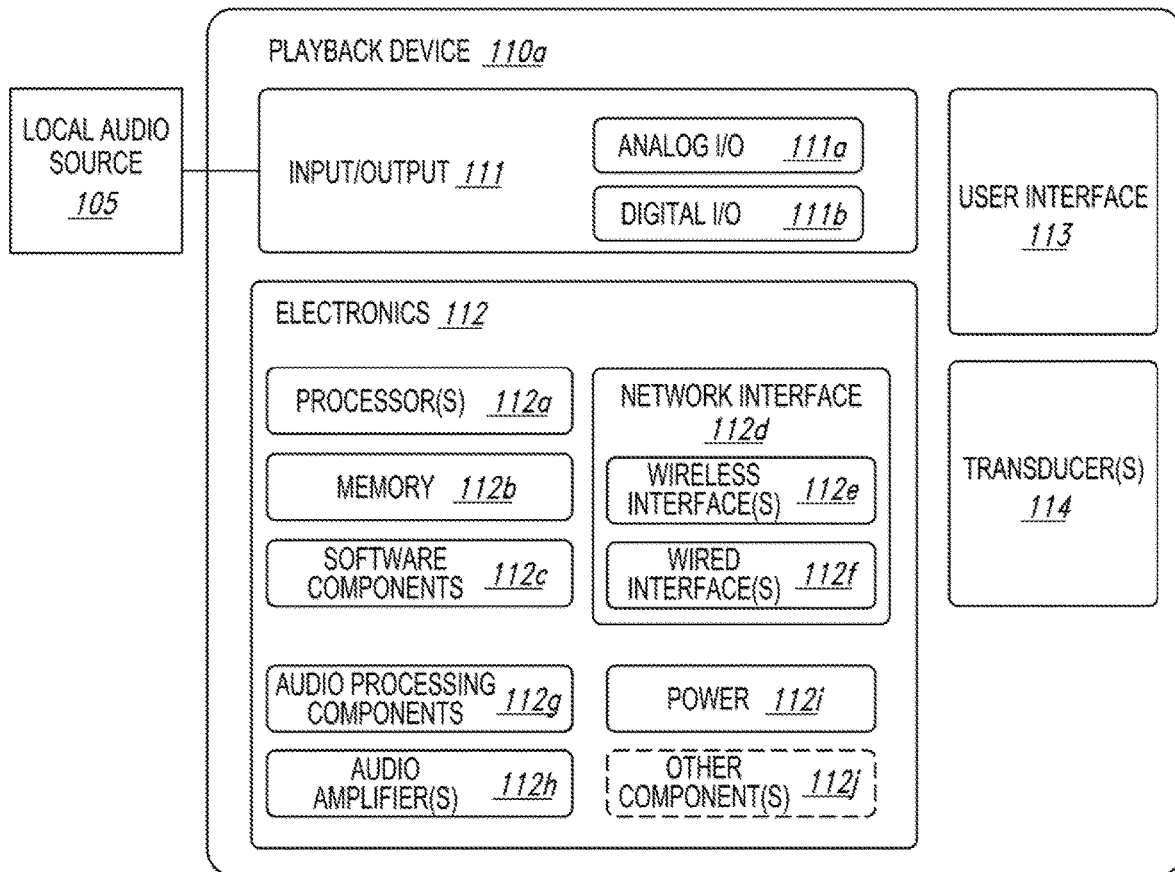
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, Wi-Fi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennas) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., Wi-Fi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
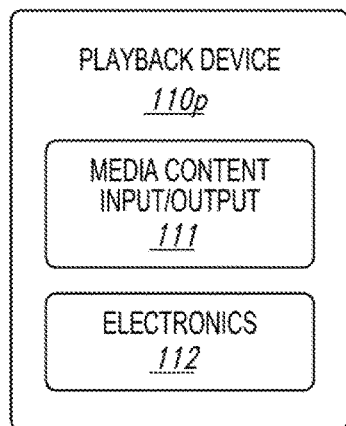
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
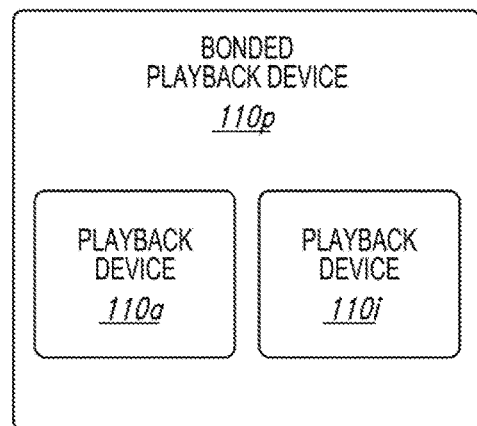
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, a wake word followed by an utterance including a user request. As those of ordinary skill in the art will appreciate, an wake word is a word or other audio cue that signifying a user voice input. For instance, in querying the AMAZON® VAS, a user might speak the wake word "Alexa." Other examples include "Ok, Google" for invoking the GOOGLE® VAS and "Hey, Siri" for invoking the APPLE® VAS.

After detecting the wake word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the wake word "Alexa" followed by the utterance "set the thermostat to 68 degrees" to set a temperature in a home (e.g., the environment 101 of FIG. 1A). The user might speak the same wake word followed by the utterance "turn on the living room" to turn on illumination devices in a living room area of the home. The user may similarly speak an wake word followed by a request to play a particular song, an album, or a playlist of music on a playback device in the home.

d. Suitable Control Devices

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c,* media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

FIGS. 1-I through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Figure 1M:
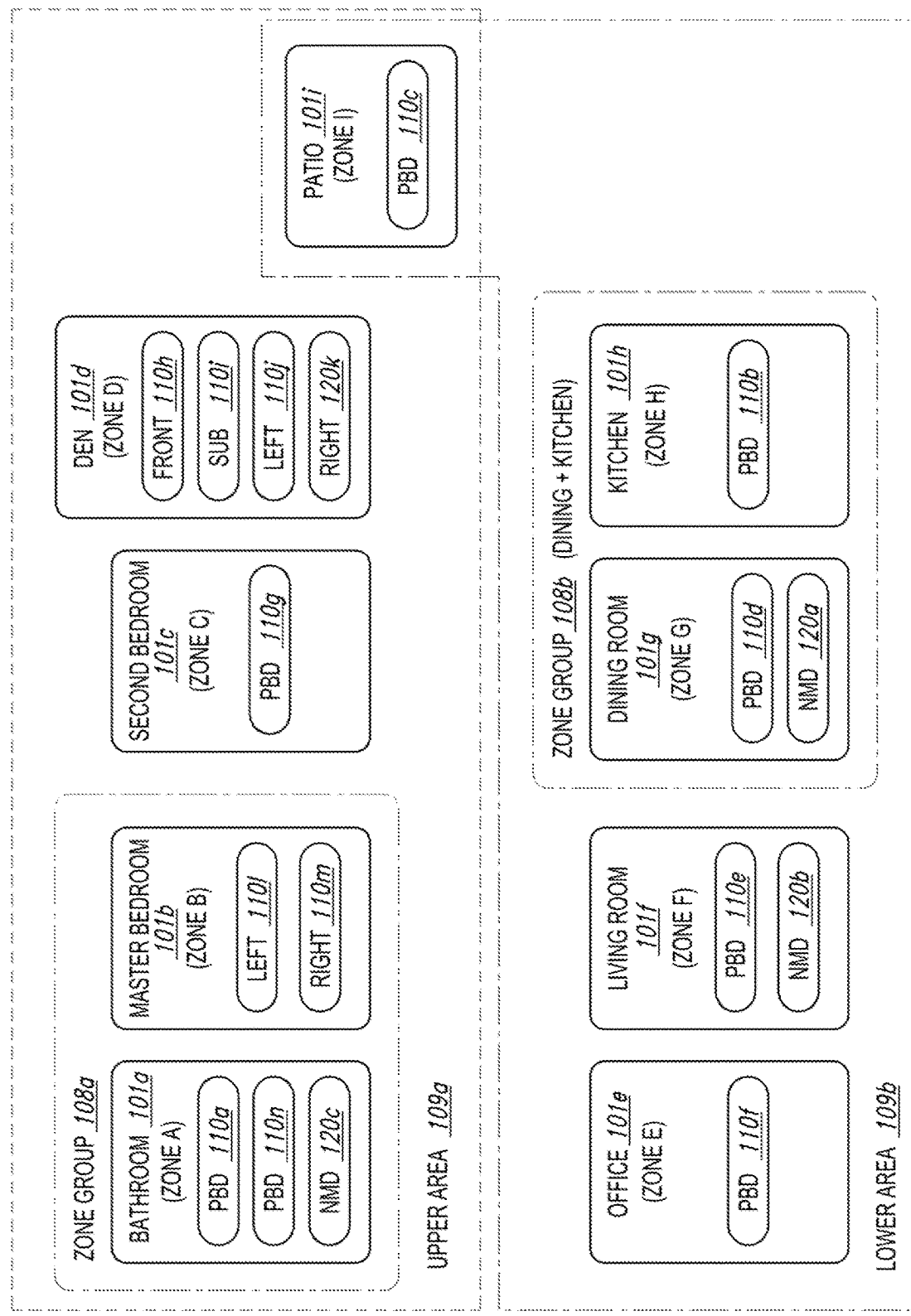
FIG. 1M is a schematic diagram of media playback system areas.

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
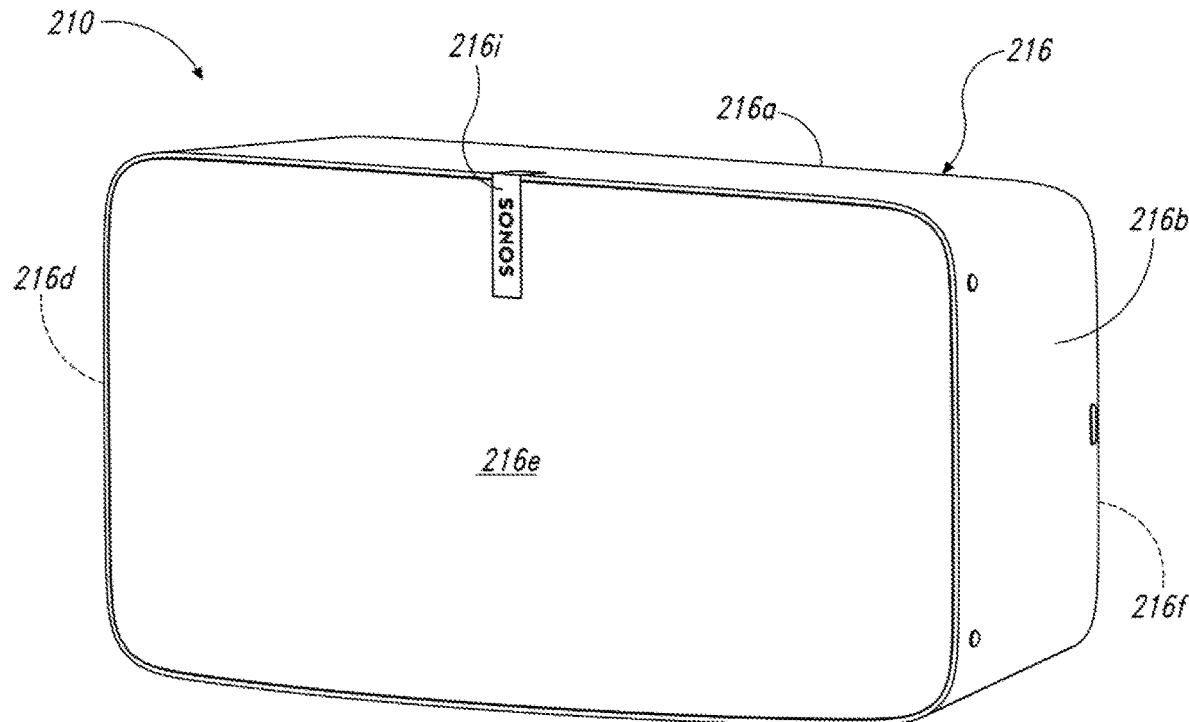
FIG. 2A is a front isometric view of a playback device configured in accordance with aspects of the disclosed technology.
Figure 2B:
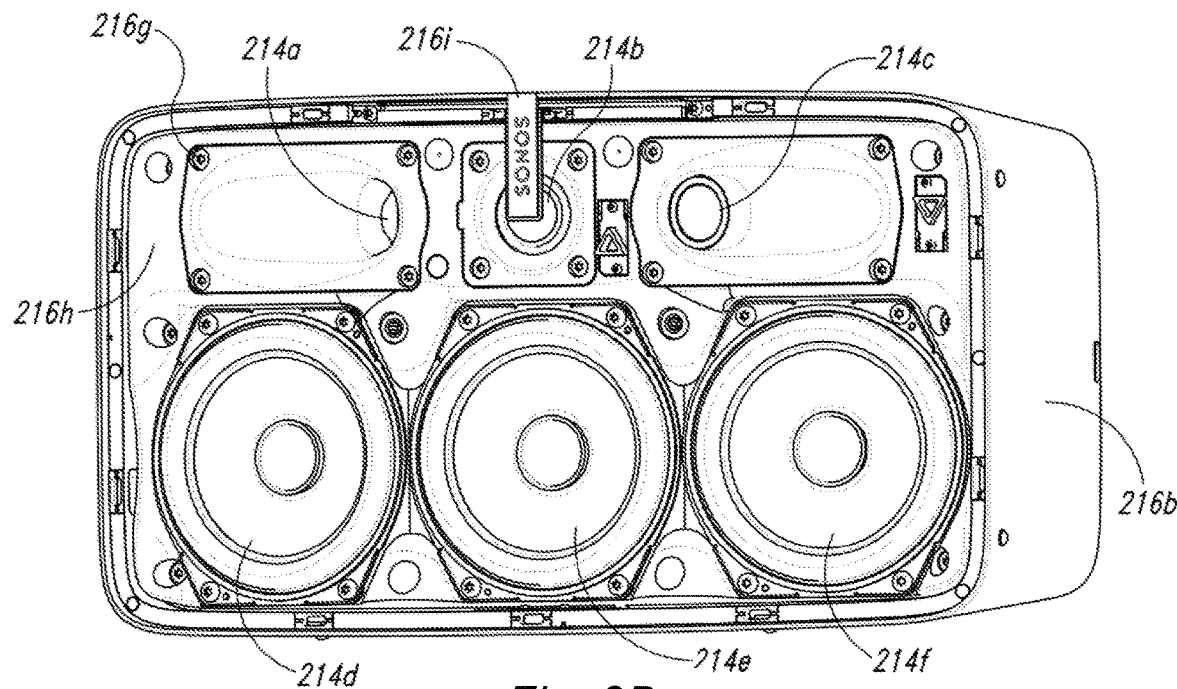
FIG. 2B is a front isometric view of the playback device of FIG. 3A without a grille.
Figure 2C:
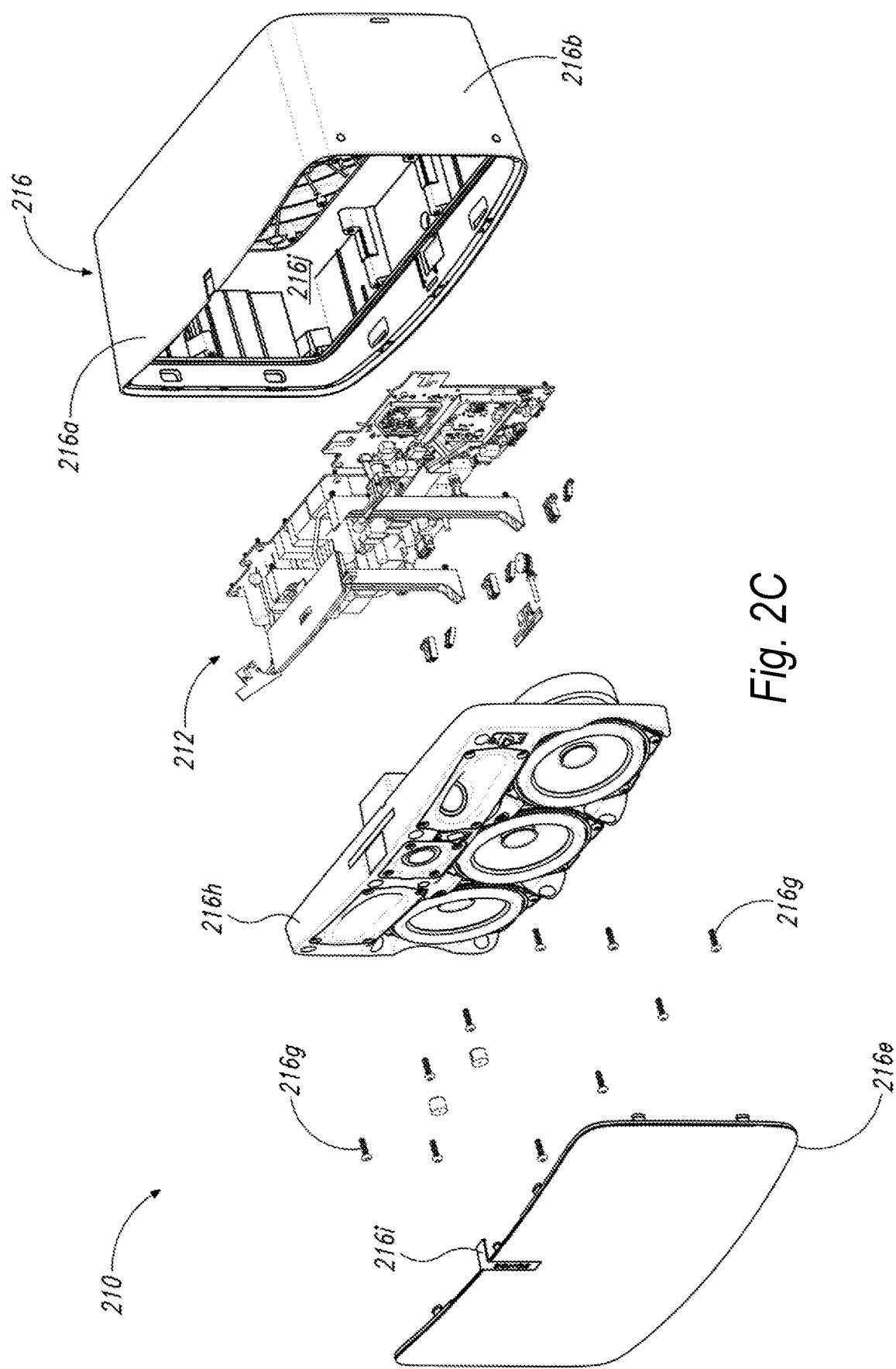
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figure 3A:
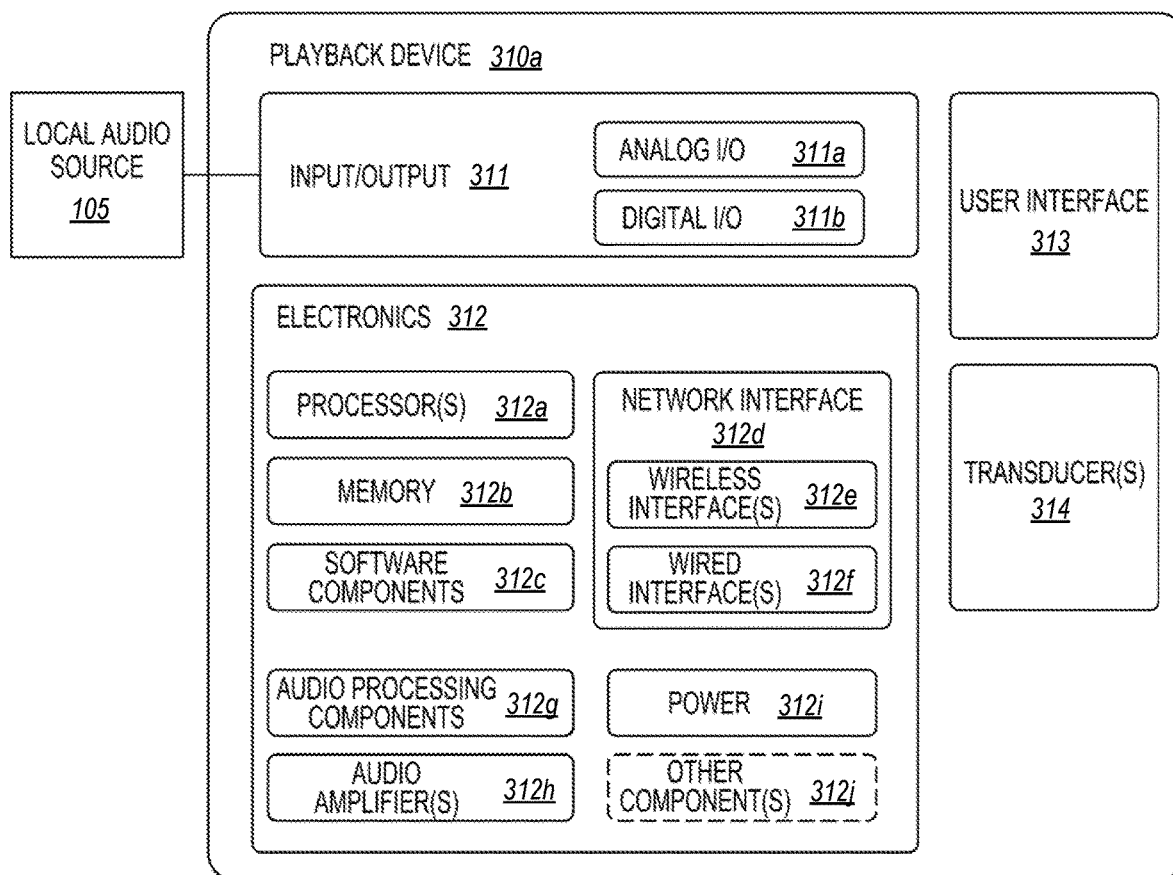
FIG. 3A is a block diagram of a portable playback device configured in accordance with aspects of the disclosed technology.

FIG. 3A is a block diagram of a portable playback device 310 configured in accordance with embodiments of the disclosed technology. In contrast to the playback device(s) 110, the portable playback device 310 is configured to facilitate portable (battery-powered) operation in addition to operation while connected to AC (wall) power. The portable playback device 310 includes similar components as the playback device 110*a* (FIG. 1C) including an input/output 311, electronics 312, user interface 313, and transducers 314, which are similar to the corresponding input/output 111, electronics 112, user interface 113, and transducers 114 of the playback device 110*a*, including similar sub-components.

Yet, the components of the portable playback device 310 may differ in various ways to facilitate portable operation. For instance, the power 312*i* may include batteries to power operation of the portable playback device 310 while disconnected from AC power. As another example, the transducers 114 may be relatively smaller than transducers of the playback device 210 for example, so as to use relatively less power intensive to drive using the audio amplifiers 312*h* during playback. Yet further, the software components 312*c* may be configured to more aggressively enter power-saving modes as compared with other playback devices that are configured to operate using AC power. Other examples are possible as well.

Figure 3B:
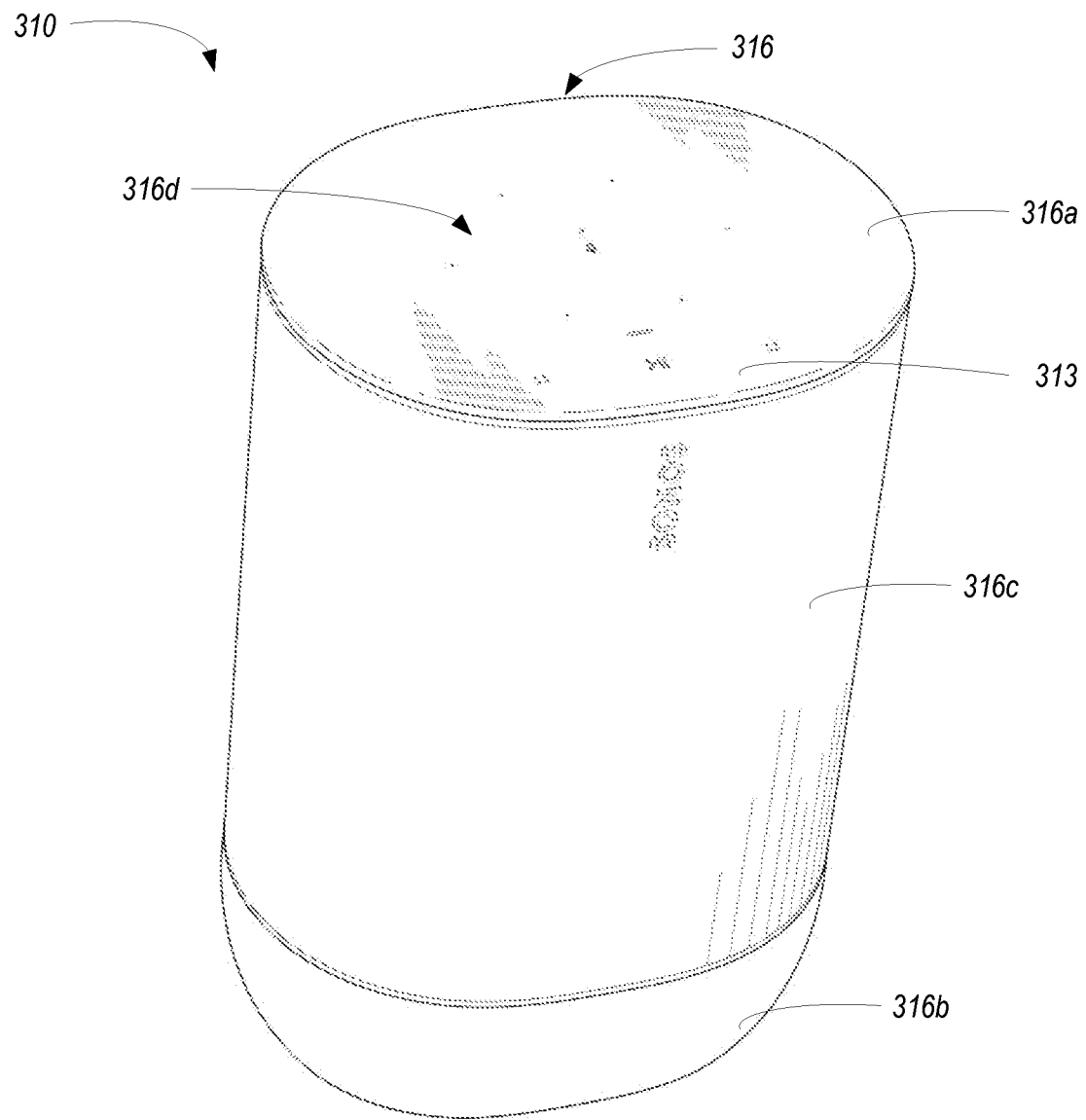
FIG. 3B is a front isometric view of a portable playback device.
Figure 3C:
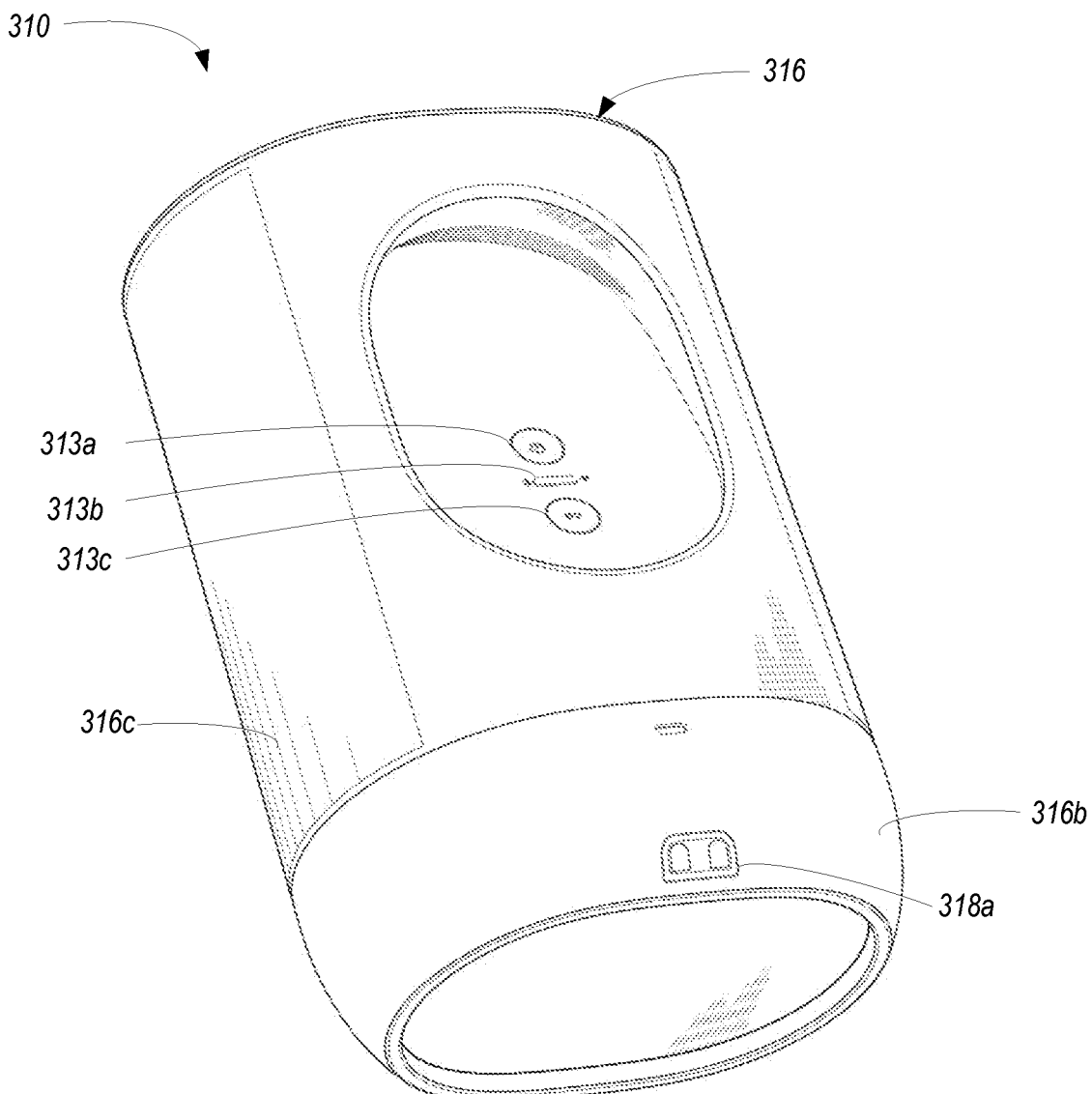
FIG. 3C is a rear isometric view of the portable playback device of FIG. 3B.
Figure 3D:
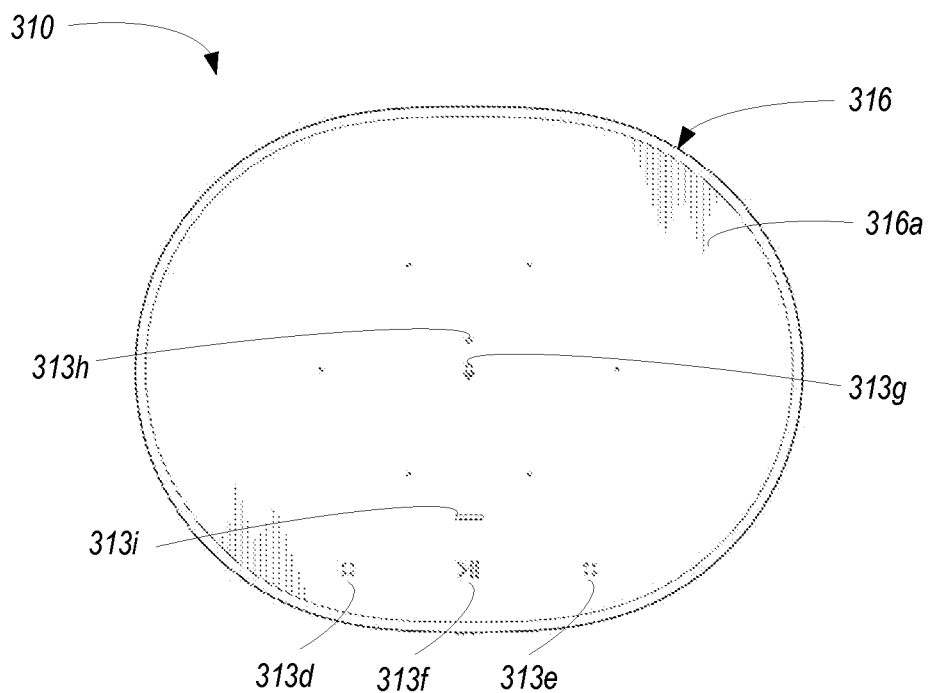
FIG. 3D is a top view of the portable playback device of FIG. 3B.
Figure 3E:
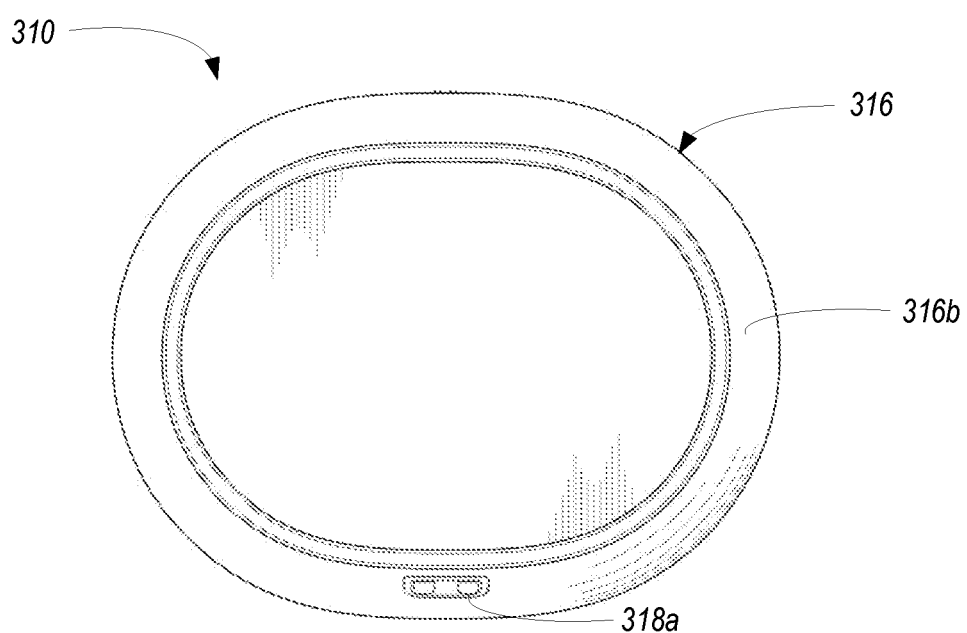
FIG. 3E is a bottom view of the portable playback device of FIG. 3B.

FIGS. 3B and 3C are front and rear isometric views, respectively, of the portable playback device 310 configured in accordance with embodiments of the disclosed technology. FIGS. 3D and 3E are top and bottom views, respectively, of the portable playback device 310.

Referring first to FIGS. 3A-3B, the portable playback device 310 includes a housing 316 comprising an upper portion 316*a*, a lower portion 316*b* and an intermediate portion 316*c* (e.g., a grille). A plurality of ports, holes or apertures 316*d* in the upper portion 316*a* allow sound to pass through to one or more microphones 315 positioned within the housing 316. The one or more microphones 315 are configured to received sound via the apertures 316*d* and produce electrical signals based on the received sound.

The user interface 313 includes a plurality of control surfaces (e.g., buttons, knobs, capacitive surfaces) on the top and rear of the portable playback device 310. Referring to FIG. 3C, the rear of the portable playback device includes a first button 313*a* (power), a second button 313*b* (a toggle for IEEE 802.11- and 802.15-compatible interfaces), and a third button 313*c* (reset). Referring to FIG. 3D, the top of the portable playback device 310 includes a first control surface 313*d* (e.g., a previous control), a second control surface 313*e* (e.g., a next control), and a third control surface 313*f* (e.g., a play and/or pause control). A fourth control surface 313*g* is configured to receive touch input corresponding to activation and deactivation of the one or microphones 315.

The user interface 313 also includes indicators. A first indicator 313*h* (e.g., one or more light emitting diodes (LEDs) or another suitable illuminator) can be configured to illuminate only when the one or more microphones 315 are activated. A second indicator 313*i* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Figure 3F:
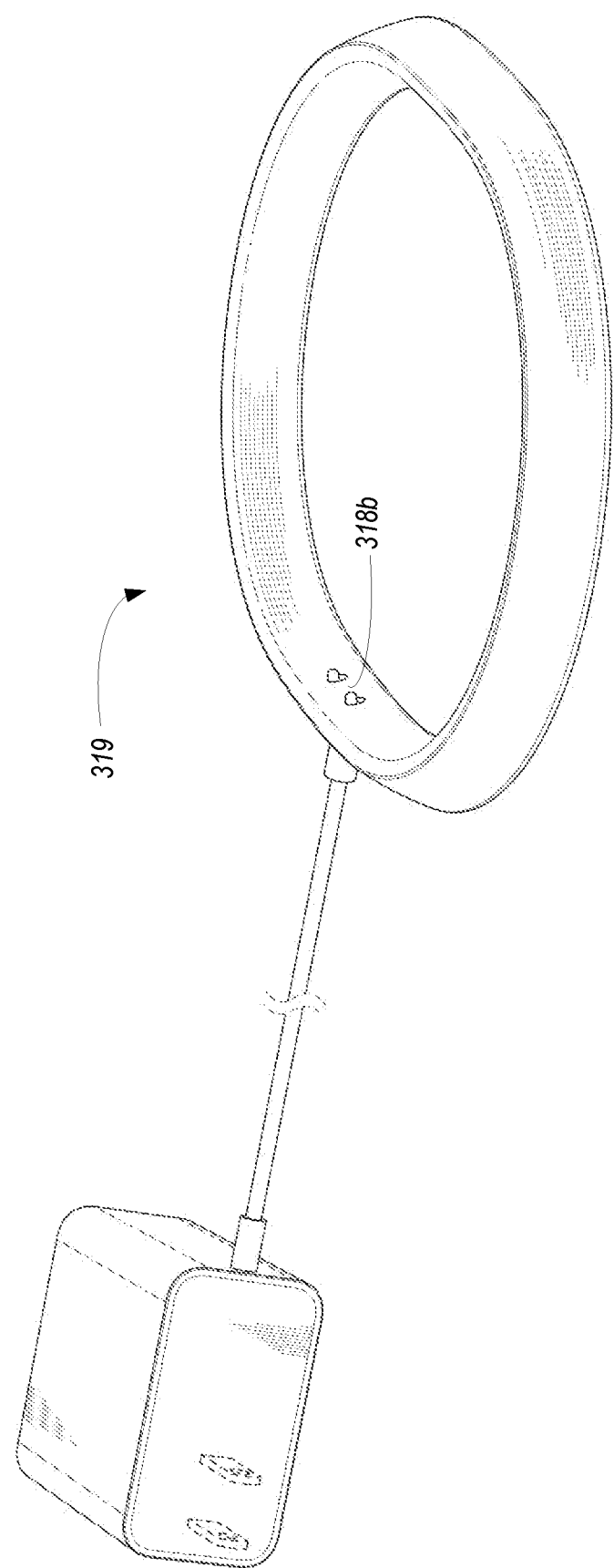
FIG. 3F is an isometric view of a charging base configured to facilitate charging of the portable playback device of FIG. 3B.

Referring to FIG. 3E, the lower portion 316 of the housing 316 includes first electrical contacts 318*a*. FIG. 3F is an isometric view of a charging base 319. When the portable playback device 310 is placed onto the charging base 319, the first electrical contacts 318*a* make contact with second electrical contracts 318*b* of the charging base 319 completing a circuit within the power 312 of the portable playback device. The portable playback device 310 draws current from an AC outlet to operate and/or charge batteries of the power 312*i*.

Referring to FIGS. 3A-3E together, the portable playback device 310 includes an NMD 320 is configured to receive voice commands from one or more adjacent users via the one or more microphones 315. As described above with respect to FIG. 1B, the one or more microphones 315 can acquire, capture, or record sound in a vicinity (e.g., a region within 10*m* or less of the NMD 320) and transmit electrical signals corresponding to the recorded sound to the electronics 312. The electronics 312 can process the electrical signals and can analyze the resulting audio data to determine a presence of one or more voice commands (e.g., one or more wake words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis.

The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
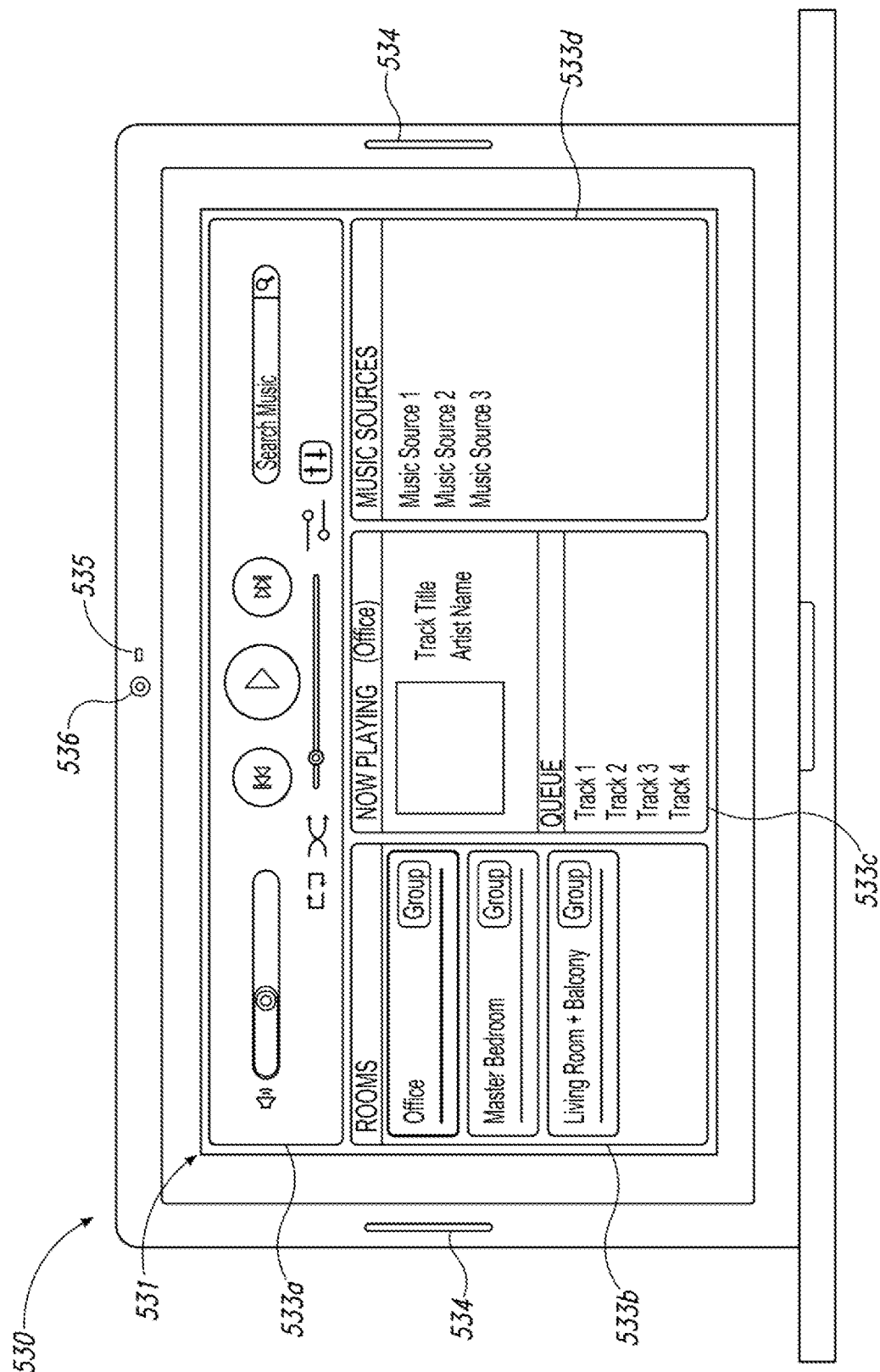
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
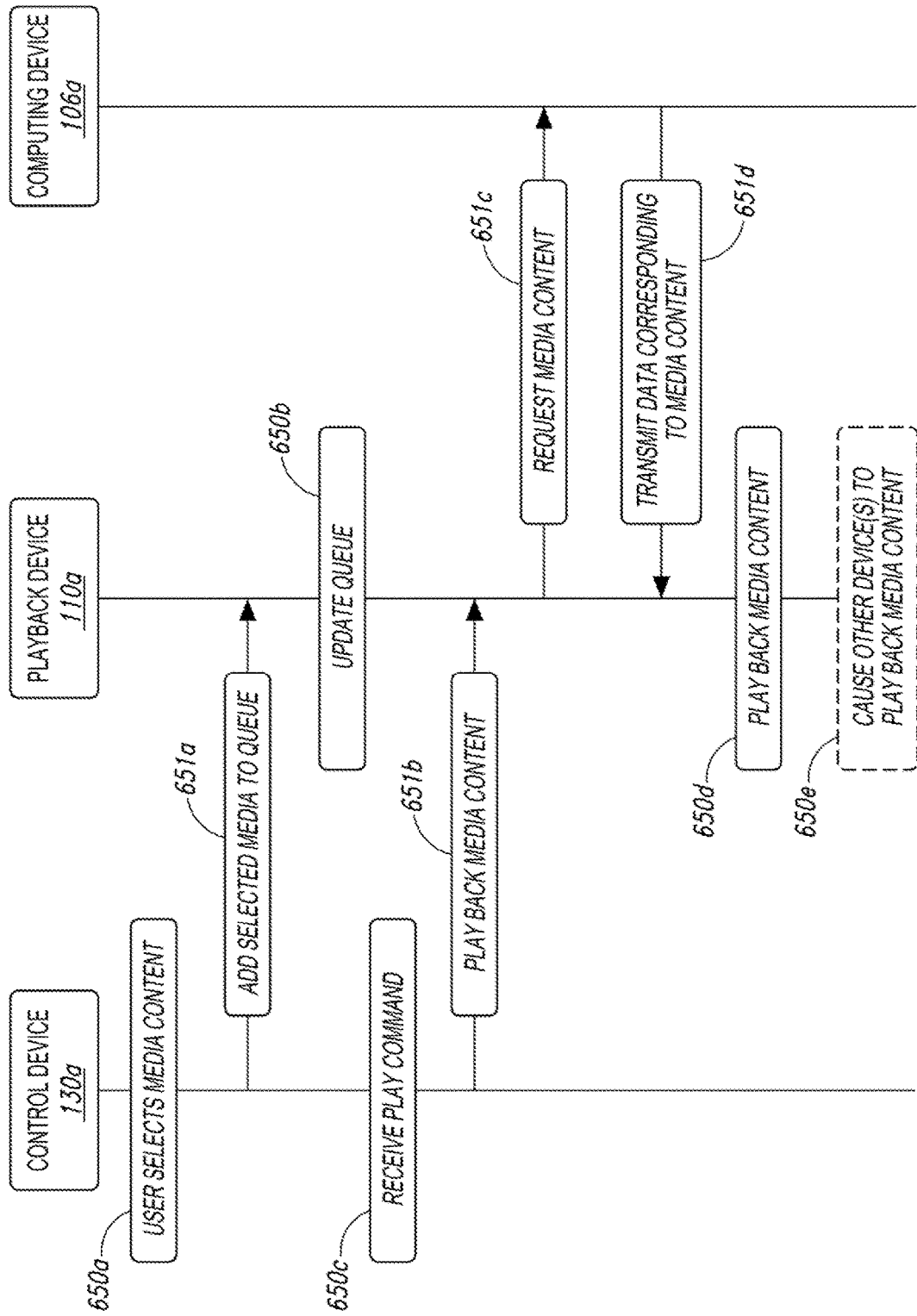
FIG. 6 is a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

IV. Example Power Coordination

Figure 7A:
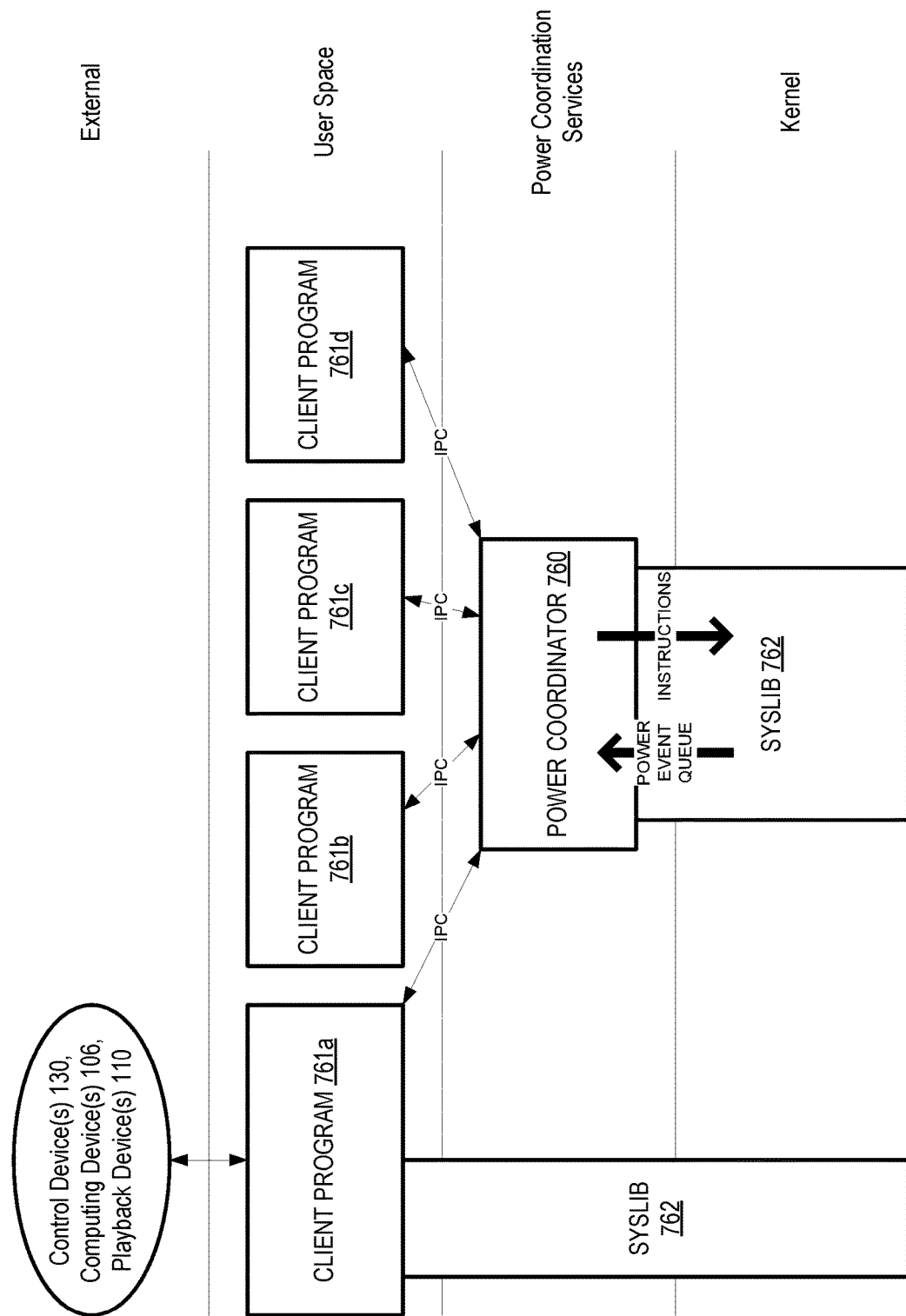
FIG. 7A is a functional block diagram illustrating an example power coordinator system in accordance with aspects of the disclosed technology.

FIG. 7A is a block diagram illustrating an example power coordinator system that includes a power coordinator 760, multiple client programs 761, and a syslib 762, which may be implemented as in the software components 312c of the portable playback device 310. More particularly, the power coordinator 760 is implemented as a background process (i.e., a daemon) that launches during boot of an operating system of the software components 312c. As explained in more detail below, the power coordinator coordinates between the multiple client programs 761, and the syslib 762 to manage power coordination services, such as kernel suspend and power level.

Some or all of the programs executing on the playback device 310 may be configured as client programs 761 of the power coordinator 760 to facilitate participation in power coordination of the portable playback device 310. By participating in power coordination, the client programs 761 influence various power-related operations, such as when the portable playback device 310 suspends and resumes, as well as the current power level of the portable playback device 310. Client programs 761 may implement a power coordination library to facilitate interaction with the power coordinator 760 over the respective IPC mechanisms, possibly compiled as a shared object (e.g., a dynamically linked library).

As shown, the client programs 761 include client programs 761a, 761b, 761c, and 761d. By way of illustration, client program 761a is a control plane program configured to control audio playback by the portable playback device 310. Client program 761b is a network manager configured to manage 802.11 connections via the network interface 312d. Similarly, client program 761c is a connection manager that, in operation, manages 802.15 connections via the network interface 312d. Client program 761d is an upgrade manager configured to manage upgrades to the software components 312c of the portable playback device 310. These client programs are shown by way of example, and other implementations may include additional or fewer client programs, as well as client programs that are responsible for different device functions.

In operation, the power coordinator 760 registers the multiple client programs 761 by establishing respective inter-process communication (IPC) mechanisms between the power coordinator 760 and the multiple client programs 761. As shown by way of example in FIG. 7A, the power coordinator 760 has established respective IPC mechanisms between the power coordinator 760 and the client programs 761a, 761b, 761c, and 761d. These IPC mechanisms allow the client programs 761a, 761b, 761c, and 761d and the power coordinator 760 to communicate with one another.

In some examples, a particular subset of the multiple client programs 761 may be considered critical. For instance, the client programs 761a may be considered critical, as its responsible for audio playback. If the IPC mechanism(s) between the power coordinator 760 and the critical client programs 761 become disconnected, the power coordinator 760 might not know whether a kernel suspend is safe to perform (i.e., whether a suspend would interrupt functions of the critical client program). In such circumstances, the power coordinator 760 may prevent kernel suspend when the respective IPC mechanisms between the particular subset of client programs and the power coordinator background process are disconnected. When such disconnection occurs, the power coordinator 760 may attempt to reestablish the IPC mechanism(s) so that operation can continue normally.

The syslib 762 is a system library that provides the power coordinator 760 access to kernel functions using commands, function calls, protocols, and/or objects, which are collectively referred to as instructions in FIG. 7A. Example kernel functions include suspend and set power level, among others. To access such functions, the power coordinator 760 may make a function call to the appropriate function in the library. Certain client programs 761 (i.e., client program 761a) have access to the syslib 762 in addition to the power coordinator 760. Such access facilitates communication with kernel drivers, which control hardware components of the portable playback device 310. For example, as shown in FIG. 7A, client program 761a has access to the syslib 762 to control kernel drivers corresponding to the audio pipeline (e.g., the audio processing components 312g and audio amplifier(s) 312h).

As further shown in FIG. 7A, the syslib 762 maintains a power event queue. In some examples, the power event queue may be implemented as a first-in-first-out data structure. Power events generated by the kernel are placed into the queue by the syslib 762. In operation, the power coordinator 760 reads the power event queue for information on power events generated by the kernel. The power coordinator 760 may further distribute data indicating these events to the client programs 761, which may modify their operation or take action based on this information.

One example power event is "resumed source event," which is generated when the portable playback device 310 resumes from kernel suspend. Via this power event, the syslib 762 communicate the reason that the portable playback device 310 came out of kernel suspend. Various triggers to kernel resume are discussed in more detail below.

Other example power events relate to the battery. For instance, one example power event may be "charge state changed," which is generated when the battery is connected to or disconnected from a charging source such as the charging base 319 (FIG. 3F). Another example power event is "battery fault," which is generated when the battery is dead or when the battery has an issue such as overheating. A further example power event is a "battery voltage level (percentage) triggered," which is generated when a certain battery voltage level is reached during charging or discharging. Yet another example power event is "battery voltage level critical," which is generated when the battery voltage level reaches some pre-defined critical level (e.g., 1%). Other example power events may be generated in addition to these examples.

In an example, the power coordinator 760 receives, from the syslib 762, charge state event data indicating a charge state of the battery, the charge state comprising one of: (a) the battery is connected to a charging source or (b) the battery is disconnected from the charging source. The power coordinator 760 may receive the charge state event data via a power event in the power event queue. The power coordinator 760 sends, via the established IPC mechanisms to the multiple client programs 761, messages indicating the charge state of the battery. As noted above, the client programs 761 may modify their operation or take action based on such data. For instance, the client program 761a may send a message to the power coordinator 760 indicating that the given client program is ready to suspend and a given resume time, wherein the given client program determines the given resume time based on the charge state of the battery.

Figure 7B:
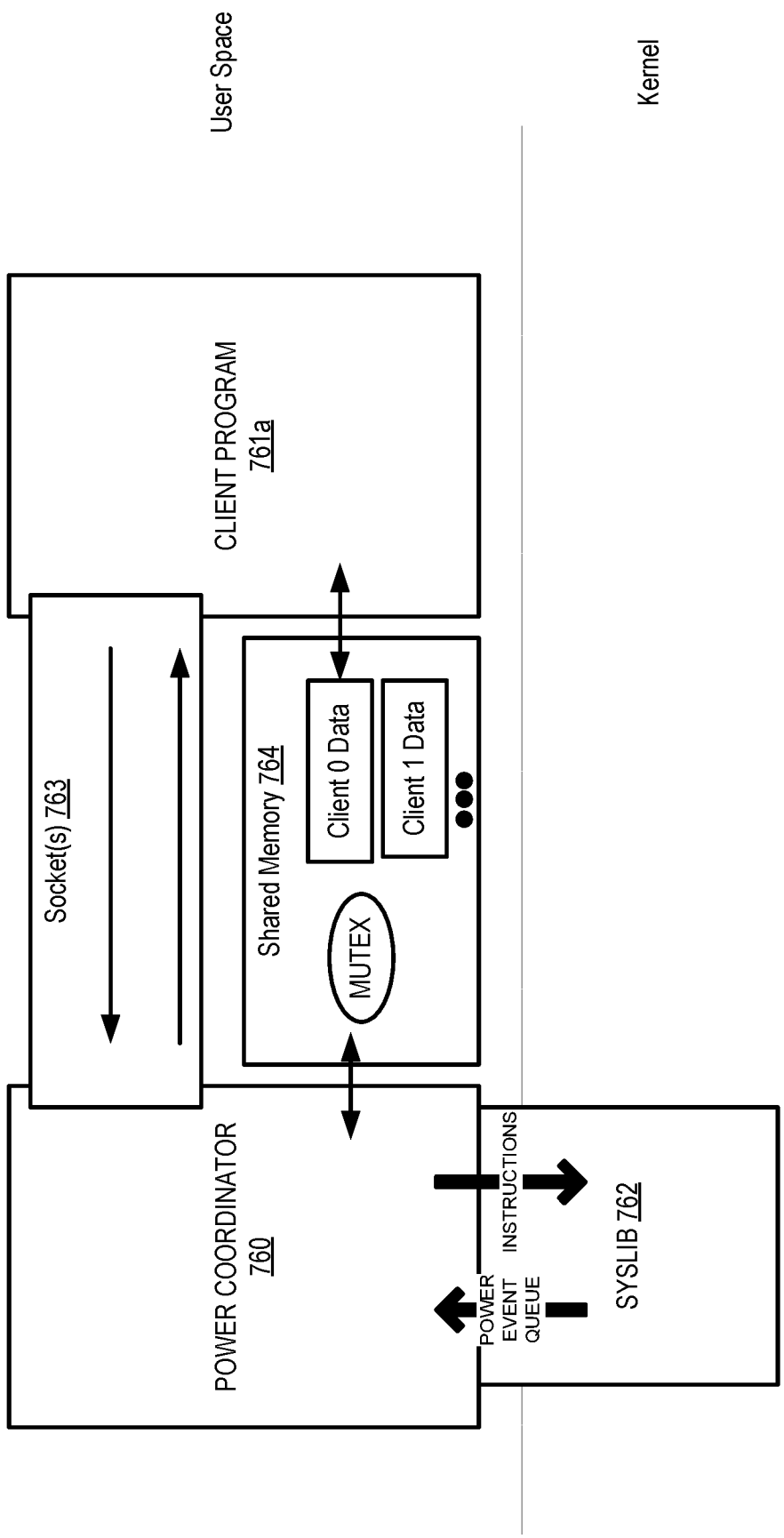
FIG. 7B is a functional block diagram illustrating an example inter-process communication in accordance with aspects of the disclosed technology.

FIG. 7B is a block diagram illustrating example inter-process communication between the power coordinator 760 and the client program 761a. As shown in FIG. 7B, the example inter-process communication includes socket(s) 763 and shared memory 764. The socket(s) 763 are a set of data communication endpoints for exchanging data (e.g., messages) between the power coordinator 760 and the client program 761a. The shared memory 764 is a segment of memory accessible to both the power coordinator 760 and the client program 761a. Since both the power coordinator 760 and the client program 761a can read and write to the shared memory 764, the shared memory 764 can be used to communicate and share data. In some examples, the portable playback device 300 may implement a mutex, as shown. The mutex is set by the power coordinator 760 or the client program 761a when accessing the shared memory, in an effort to prevent simultaneous access and accordant issues, such as race conditions.

As one example, the multiple client programs 761 may use the IPC mechanisms to communicate when to kernel suspend and resume. During kernel suspend, the main processor(s) of the portable playback device are suspended, and userspace programs like the power coordinator 760 and the client programs 761 are not executing, which reduces power consumption of the portable playback device 310. However, since these programs are not executing, they cannot perform their intended functions.

Accordingly, the power coordinator 760 may implement a kernel suspend algorithm configured to determine when each client program is ready to kernel suspend. In example implementations, in an attempt to avoid interrupting operation of a client program 761, the power coordinator refrains from initiating kernel suspend until every client program 761 is ready to suspend. In alternative implementations, certain client programs may be classified as a first type of client program that is permissible to interrupt, while other client programs are classified as a second type of client program for which interruption is prohibited. In operation, the power coordinator 760 may receive respective messages indicating that each client program 761 is ready to suspend. Based on these messages, the power coordinator 760 may determine that the portable playback device 310 may enter kernel suspend. Ultimately, to cause the portable playback device 310 to kernel suspend, the power coordinator 760 sends instructions to the operating system using the syslib 762 (e.g., by using a function call or command).

Figure 7C:
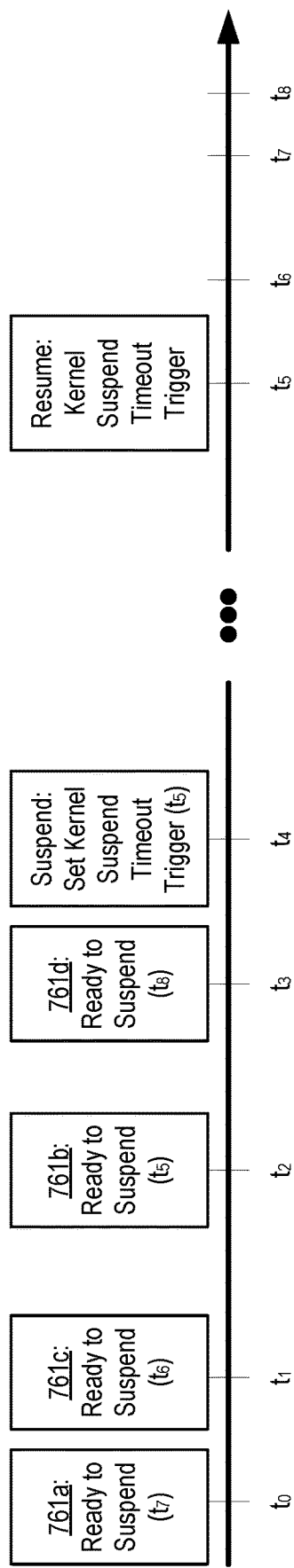
FIG. 7C is a timing diagram illustrating an example suspend algorithm in accordance with aspects of the disclosed technology.

FIG. 7C is a timing diagram illustrating an example suspend algorithm that the power coordinator 760 may implement to determine when to kernel suspend. As shown in FIG. 7C, at time $t_0$, the power coordinator 760 receives a message from client program 761a indicating that client program 761a is ready to suspend. The message also includes a time ($t_7$) when the client program 761a must be resumed. Similarly, at times $t_1$, $t_2$, and $t_3$, respectively, the power coordinator 760 receives messages from client programs 761c, 761b, and 761d indicating that each client program is ready to suspend, along with the respective time that each client must be resumed. At time $t_4$, the power coordinator 760 determines each client program of the multiple client programs is ready to suspend, and, based on this determination, sends instructions to the operating system to kernel suspend (e.g., via syslib 762).

At time $t_4$, the power coordinator 760 also sets a kernel suspend timeout trigger to the earliest resume time among the resume times indicated in the received messages from the multiple client programs, which in this example is time $t_5$. Since the power coordinator 760 is not executing during kernel suspend, the kernel suspend timeout trigger is set via the syslib 762 on an auxiliary processor or secondary component that is executing during kernel suspend. Prior to time $t_5$, other wake up triggers may cause the portable playback device 300 to resume. Further details regarding wake up triggers are discussed in more detail below.

Figure 7D:
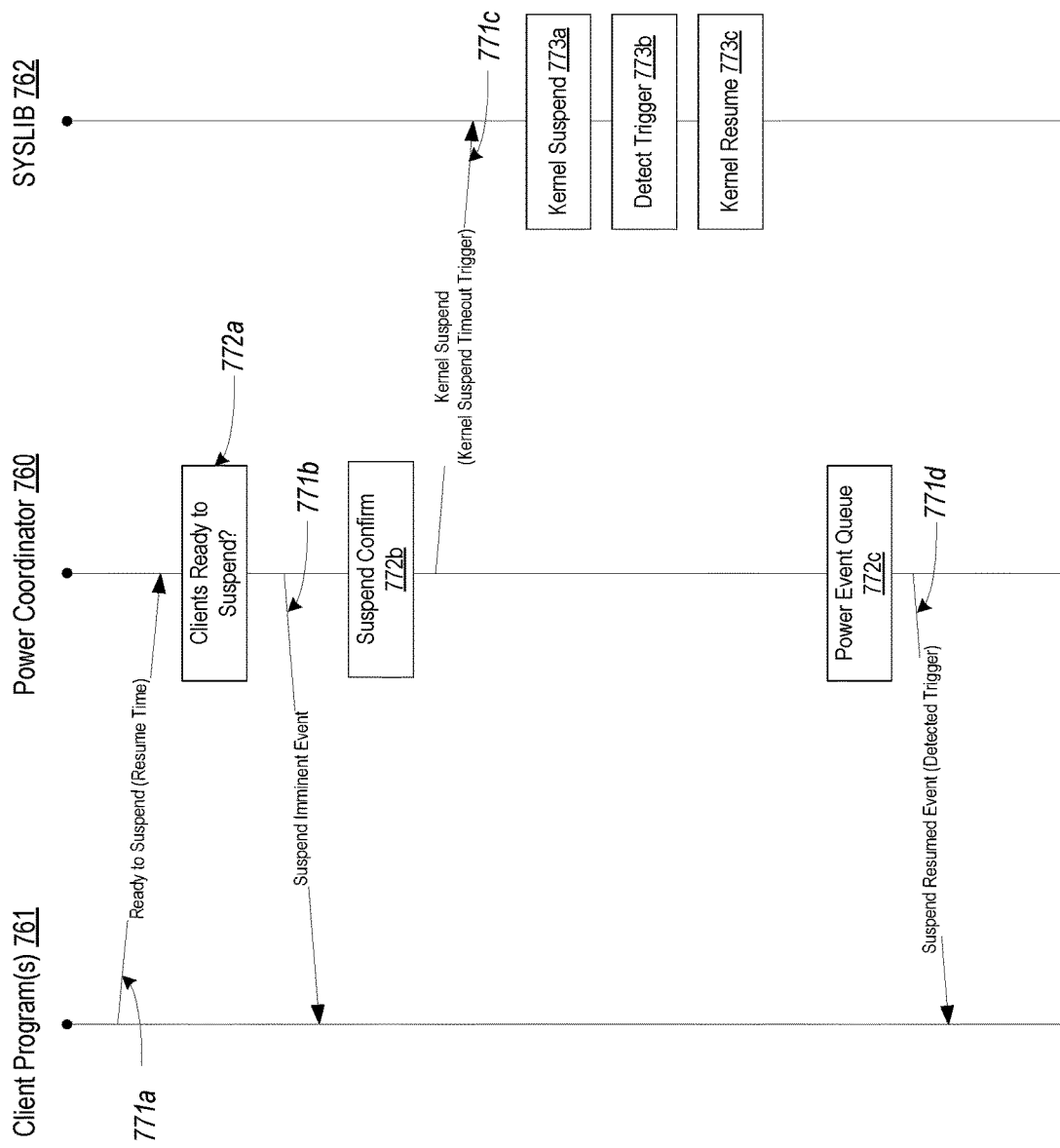
FIG. 7D is a message flow diagram further illustrating the example suspend algorithm of FIG. 7C.

FIG. 7D is a message flow diagram illustrating messages exchanged between the power coordinator 760, the multiple client programs 761, and the syslib 762 to facilitate the example suspend algorithm. In operation, each client program 761 may determine whether the respective client program is ready to kernel suspend. Generally, client programs 761 are ready to kernel suspend when they not in use (i.e., idle) and do not expect to be in use during the kernel suspend. For instance, the client program 761a may determine that it is ready to kernel suspend when idle (i.e., not controlling the portable playback device 310 to play back audio) and when no commands to play back audio during the kernel suspend have been received. Since the portable playback device 310 uses significantly less power while in kernel suspend (as compared with not suspended), the multiple client programs 761 may repeatedly (e.g., periodically) determine whether they are ready to suspend and communicate their respective status to the power coordinator 760 using their respective IPC mechanism in an attempt to reduce the overall power use of the portable playback device 310.

At 771a, the power coordinator 760 receives messages from the client program(s) 761 indicating that the respective client program(s) 761a-d are ready to suspend. These messages may also include the respective times that each client program must be resumed. Based on these messages, at 772a, the power coordinator 760 determines that each client program 761a-d of the multiple client programs 761 is ready to suspend.

In this example, when the power coordinator 760 determines that each client program(s) 761a-d is ready to suspend, at 771b, the power coordinator 760 initiates a suspend by sending a suspend imminent event to the multiple client program(s) 761. The suspend imminent event notifies the client programs 761a-d of the forthcoming suspend and provides another opportunity for the client programs 761 to set a new resume time or power level.

After sending out the suspend imminent event, the power coordinator 760 waits a pre-determined period of time (e.g., ten seconds) for messages from the client programs requesting a new resume time or power level. During this waiting period, client programs 761 can raise or lower their respective power level requirements, which does not terminate the suspend as long as each client program remains in the ready to suspend state at the end of the suspend imminent waiting period. Further details regard raising and lowering power levels are discussed below.

After waiting, if the multiple client program(s) 761 remain in the ready to suspend state, the power coordinator 760 confirms the suspend at 772b. At this same time, the power coordinator 760 also determines the earliest resume time among the resume times indicated in the received messages from the client program(s) 761. For instance, in the FIG. 7C example, the earliest time was time $t_5$. At 771c, the power coordinator 760 sends instructions to the syslib 762 to initiate a kernel suspend and also to set a kernel suspend timeout trigger to the determined earliest resume time among the resume times indicated in the received messages from the client program(s) 761.

At 773a, the syslib 762 receives the instructions and causes the portable playback device 310 to kernel suspend. As noted above, during suspend, user spaces programs like the power coordinator 760 and the client programs 761 are not executing and the main processors are in a suspended state. The portable playback device 310 remains in suspend until a trigger to kernel resume is detected at 773b. The kernel suspend timeout trigger will resume the portable playback device 310 unless a different trigger to kernel resume is detected prior to the kernel suspend timeout trigger. The syslib 762 adds a suspend resumed event indicating the source of the kernel resume trigger to the power event queue to facilitate distributing this source among the userspace programs.

At 773c, the kernel is resumed. Once the kernel and drivers are ready, userspace programs like the power coordinator 760 and the client program(s) 761 are resumed as well. At 772c, when the power coordinator 760 is executing, the power coordinator 760 reads the power event queue, which includes the suspend resumed event indicating the source of the kernel resume trigger.

At 771d, the power coordinator 760 distributes data indicating the source of the kernel resume trigger to the multiple client programs 761. This allows the client programs to modify their operation based on the source of the kernel resume trigger. For instance, if the source of the kernel resume trigger is a wake-on-BLE (Bluetooth LE) trigger, the client program 761a may change the playback source to streaming via Bluetooth LE. Other examples are possible as well.

Figure 7E:
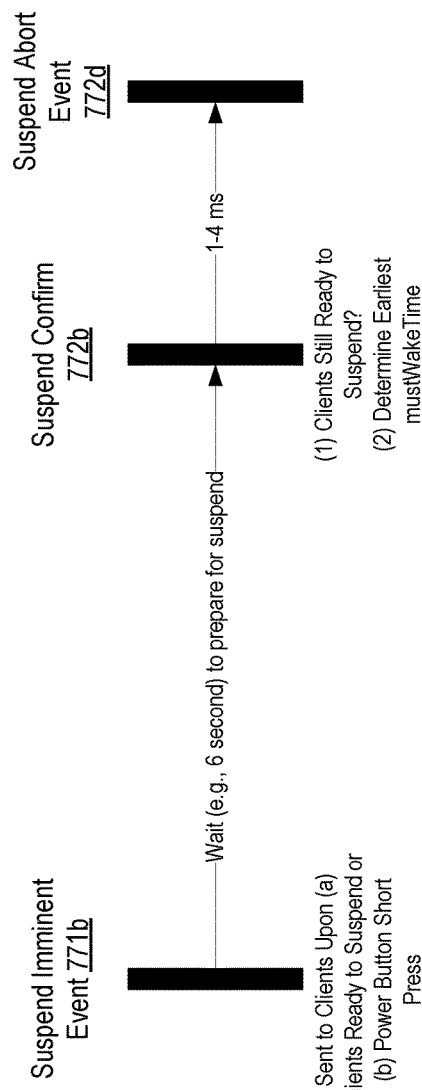
FIGS. 7E and 7F are timing diagrams illustrating exemplary kernel suspend and resume timing in accordance with aspects of the disclosed technology.

FIG. 7E is a timing diagram illustrating an example where a kernel suspend is attempted but aborted. As shown, the timing diagram of FIG. 7E begins with a suspend imminent event 771b send to the multiple clients 761. The power coordinator 760 may send the suspend imminent event 771b when the multiple client programs 761 have indicated respective ready to suspend states or when the user input indicates a request to suspend (e.g., via a short press of the power button 313a (FIG. 3C).

After waiting a pre-determined period of time (here, six seconds) for messages from the client programs requesting a new resume time or power level, the power coordinator 760 performs a suspend confirm 772b, which is an attempt to confirm the suspend. Here, the power coordinator 760 is unable to confirm the suspend. One reason that the power coordinator 760 might be unable to confirm the suspend is that the earliest mustWakeTime is too close to the current time such that the portable playback device 310 would be unable to resume by the earliest mustWakeTime (or the suspend would be inefficient). Other reasons that the power coordinator 760 might be unable to confirm the suspend include kernel errors, driver faults, and the like. Since the power coordinator 760 is unable to confirm the suspend, the power coordinator 760 sends the suspend abort event 772d, which notifies the multiple client programs 761 that the suspend has been aborted.

Figure 7F:
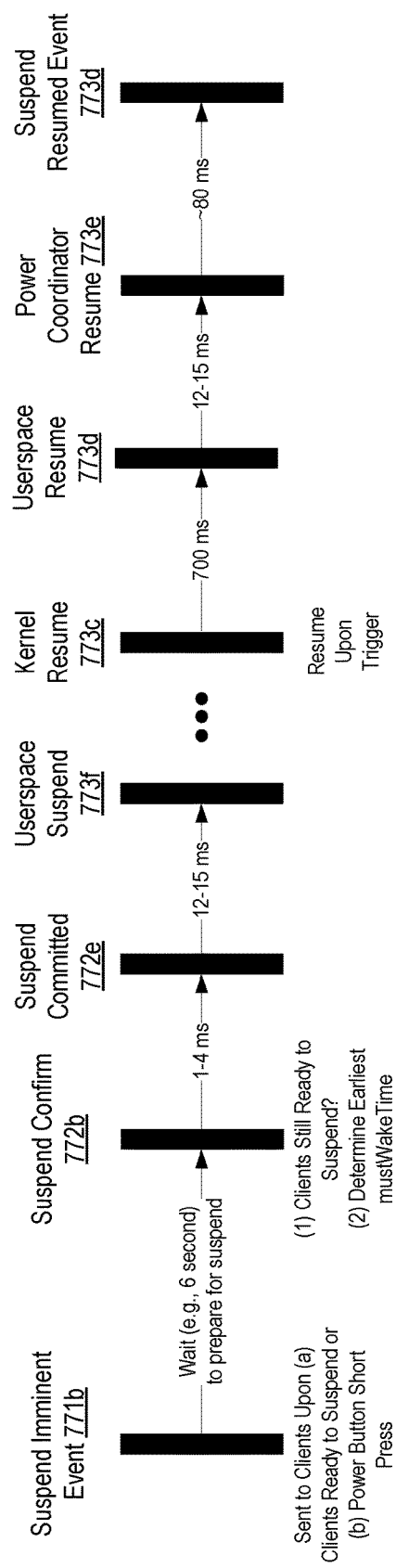

FIG. 7F is a timing diagram illustrating an example where a kernel suspend is completed. As shown, the timing diagram of FIG. 7E begins with a suspend imminent event 771b send to the multiple clients 761. After waiting a predetermined period of time, the power coordinator 760 performs a suspend confirm 772*b,* which is an attempt to confirm the suspend. Here, the power coordinator 760 is able to confirm the suspend. According, the power coordinator 760 sends the suspend committed event 772*e,* which sends instructions to the syslib 762 to kernel suspend. A short time later, the userspace programs (e.g., the power coordinator 760 and the multiple client programs 761) suspend at the userspace suspend 773*f.* At this time, the kernel and the userspace programs are suspended.

The kernel resume 773*c* occurs in response to one of the triggers to kernel resume, such as the kernel suspend timeout trigger, among others. After the kernel is resumed, the userspace resume 773*d* occurs less than a second later. The power coordinator resume 773*e* occurs a short time later as the various userspace programs are resumed. Once the power coordinator 760 is executing, the system resume event 773*d* involves the power coordinator 760 reading the kernel resume event from the power event queue populated by the syslib 762 and distributing data indicating the source of the kernel resume trigger to the multiple client programs 761.

Within examples, the power coordinator 760 may also set the power level of the portable playback device 310. The portable playback device 310 may support multiple power levels, referred to herein as a first power level, a second power level, a third power level, and so on. As noted above, a "power level" refers to a specific configuration of settings that when set, results in a given hardware performance for a particular power cost.

Various hardware settings influence power usage. Processor settings that may contribute to power level include processor frequency, number of processor cores enabled/disabled, and processor voltage, among others. Other settings that contribute to power mode include enabling/disabling components, such as the network interface 312*d,* audio processing components 312*g,* audio amplifiers 312*h,* and/or the other components 312*j.* Certain of these components may support low power modes as well. These settings may be configured by the power coordinator 860 using the syslib 862, which provides access to the kernel drivers for the corresponding components.

In some implementations, the power coordinator 760 implements a power level algorithm to set the power level of the portable playback device 310. In an example, the power coordinator 760 receives, via the established IPC mechanisms from the multiple client programs, messages indicating respective power level requirements of the multiple client programs 761. For instance, the client program 761*a* may send a message indicating that it requires the first power level, while the client programs 761*b-d* send respective messages indicating that they require relatively lower power levels, such as the second or third power levels.

Based on the received messages from the multiple client programs 761, the power coordinator 760 determines a particular power level from among the power levels indicated by each client program 761*a-d*. This particular power level is the highest power level among the respective power level requirements of the multiple client programs 671, so that each client program 761*a-d* has available sufficient resources for performing its corresponding functions. For instance, continuing the example above, the power coordinator 760 may determine that the first power level is appropriate, as the client program 761*a* requires this highest power level.

After determining the particular power level, the power coordinator 760 send instructions to the operating system to operate at the particular power level. Sending instructions to the operating system may involve making a specific combination of function calls to the syslib 762 to configure the configuration of settings that when set, results in the components of the portable playback device 310 operating at the particular power level. For instance, the power coordinator may make a first function call to set processor frequency, a second function call to enable certain processor cores, a third function call to enable the network interface(s) 312*g,* and so on.

FIG. 7G is a table showing example power levels and their corresponding settings. These examples are for purposes of illustration—commercial implementations may use different combination of settings, as well as different power levels. Other examples are possible as well.

V. Example Kernel Resume Triggers

Figure 8A:
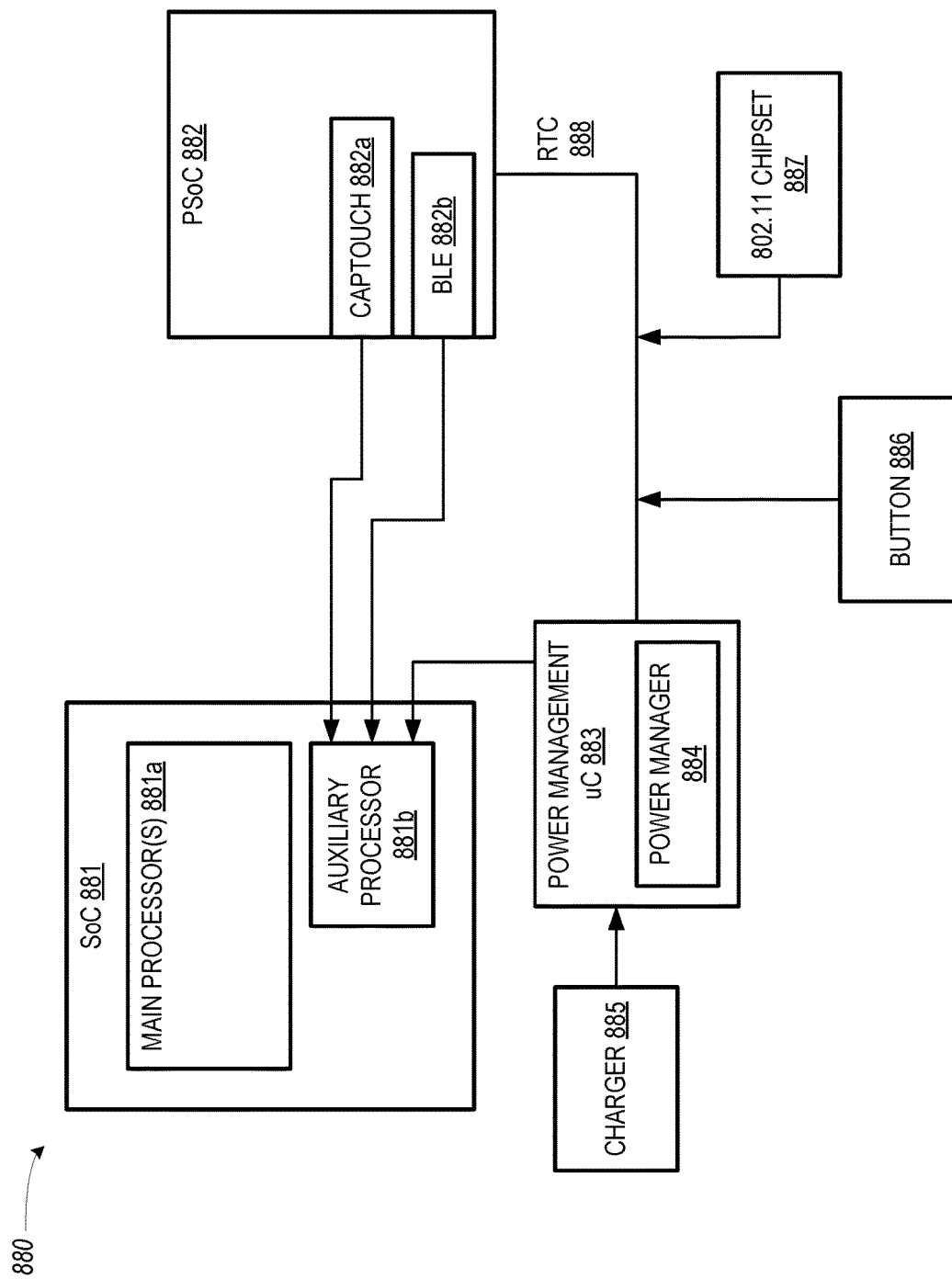
FIG. 8A is a functional block diagram illustrating example system architecture to facilitate wake triggers in accordance with aspects of the disclosed technology.

FIG. 8A is a block diagram showing an example system 880, which illustrates example architecture of certain components of the portable playback device 310. As discussed above, the power coordinator 760 determines when to kernel suspend. However, since the kernel and userspace programs, such as the power coordinator 760, are not executing during kernel suspend, kernel resume triggers must be external to the kernel and userspace programs. The architecture of system 880 facilitates kernel resume based on a plurality of kernel resume triggers from different components.

System 880 includes a system-on-chip (SoC) 881, which is an implementation of the processors 312*a* of the portable playback device 310 (FIG. 3A). SoC 881 includes main processor(s) 881 and auxiliary processor 882. In this example, the main processor(s) 881*a* and auxiliary processor 881*b* are implemented as separate cores on the SoC 881. The kernel executes on the SoC 881, as well as various userspace programs executing on top of the kernel.

To facilitate various power levels, the main processor(s) 881*a,* as well as the auxiliary processor 881*b,* are individually power- and clock-gated. In various examples, the kernel can distribute the workload of the portable playback device 310 to the available cores. During kernel suspend, the main processors 881 are power gated to reduce power usage but the auxiliary processor 881*b* is kept active to receive interrupts that trigger kernel resume. The main processors 881*a* are resumed by the auxiliary processor 881*b.*

System 880 also includes a programmable system-on-chip (PSoC) 882, which is separately programmable from the SoC 881. PSoC 882 includes capacitive touch (CapTouch) 882*a* and Bluetooth Low Energy (BLE) 882*b.* PSoC 882 may include other components as well.

CapTouch 882*a* includes a driver and corresponding circuitry configured to receive input data from the capacitive touch portions of the user interface 313, such as the first control surface 313*d,* the second control surface 313*e,* the third control surface 313*f,* and fourth control surface 313*g* (FIG. 3D). The CapTouch 882*a* driver interprets this data and generates corresponding commands, which are shared with the SoC 881 and ultimately the client programs 761 to control various functions.

The BLE 882*b* includes a driver and corresponding circuitry configured to manage Bluetooth Low Energy connections from smartphones, tablets, and other electronic devices. In operation, the portable playback device may play back audio streams received via such BLE connections. In some examples, the portable playback device may also receive data representing transport controls, such as play, pause, and skip, via a BLE connection.

During kernel suspend, the PSoC 882 remains active to generate kernel resume triggers (e.g., interrupts). For example, in some implementations, the CapTouch 882a generates an interrupt when touch input is received via the user interface 313, which is sent to the auxiliary processor 881b to facilitate a wake-on-touch kernel resume event. As another example, when a BLE connection is made, the BLE 882b generates an interrupt, which is likewise sent to the auxiliary processor 881b to facilitate a wake-on-BLE kernel resume event.

Some implementations of the PSoC 882 include one or more sleep modes configured to resume the SoC 881. For instance, in a first sleep mode, the PSoC 882 is configured such that the capacitive touch portions of the user interface 313 are ganged together to form a single proximity detector. In this first sleep mode, capacitive touch input to any control surface of the user interface 313 triggers an interrupt to resume the SoC 881. In a second sleep mode, the PSoC 882 is configured such that only one capacitive touch portion of the user interface 313 is enabled. In this second sleep mode, capacitive touch input to the enabled control surface of the user interface 313 triggers an interrupt to resume the SoC 881. Alternatively, during kernel suspend, the PSoC remains fully active and any touch input triggers interrupt to resume the SoC 881.

System 880 further includes a power management microcontroller (uC) 883, which is part of power 312i (FIG. 3A). The power management uC 883 includes a power manager 884, which is a firmware that manages the power source (AC or battery power), delivering power via the power rails (e.g., 3V, 5V, 12V, etc.), and charging via the charger 885, among other functions. The charger 885 includes one or more of a charging base 319 or an interface that can deliver current to the portable playback device 310, such as a universal serial bus port (e.g., USB Type C or micro-USB). The power manager 884 also generates battery related events, such as "charge state changed," "battery fault," "battery voltage level (percentage) triggered," and "battery voltage level critical."

The power management uC 883 is also connected to a button 886, which may be implemented as the power button 313a (FIG. 3C). To support wake-on-button, the power manager 884 is configured to detect a button press (e.g., a short button press). When a button press is detected, the power manager 884 sends a kernel resume event (e.g., an interrupt) to the auxiliary processor 881b of the SoC 881, which causes kernel resume as discussed above.

System 880 also includes a Wi-Fi (802.11-compatible) chipset 887 that includes a wireless network interface. The wireless network interface supports Wi-Fi connections over an 802.11-compatible standard such as 802.11 ac and/or 802.11 a/b/g/n. The Wi-Fi 887 generates wake-on-wireless events (e.g., interrupts) when a wake-on-wireless magic packet is received via the wireless network interface. The power manager 884 receives these events and sends a corresponding event to the auxiliary processor 881b to wake up the main processors 881a and resume the kernel.

System 880 also includes a real time clock (RTC) 888. The RTC 888 manages kernel resume triggers based on clock time, such as alarms and the kernel resume timeout trigger. In an example, the RTC 888 is implemented in the PSoC 882, as the PSoC 882 is already awake during kernel suspend to support kernel resume triggers from CapTouch 882a and/or BLE 882b. Alternatively, the RTC 888 may be implemented in a different integrated circuit, such as the power management uC or a dedicated RTC IC.

In an example, alarms are set via the client program 761a. The client program 761a in turn sets the alarm in the RTC 888 via instructions to syslib 762 (FIG. 7A). At the time of the alarm, the RTC generates a kernel resume event (e.g., an interrupt). Similarly, the power coordinator 760 sets a kernel suspend timeout trigger in the RTC 888 via the syslib 762. During a kernel suspend, if no other kernel resume trigger occurs, the portable playback device 310 is resumed via the kernel suspend timeout trigger generated by the RTC 888.

Figure 8B:
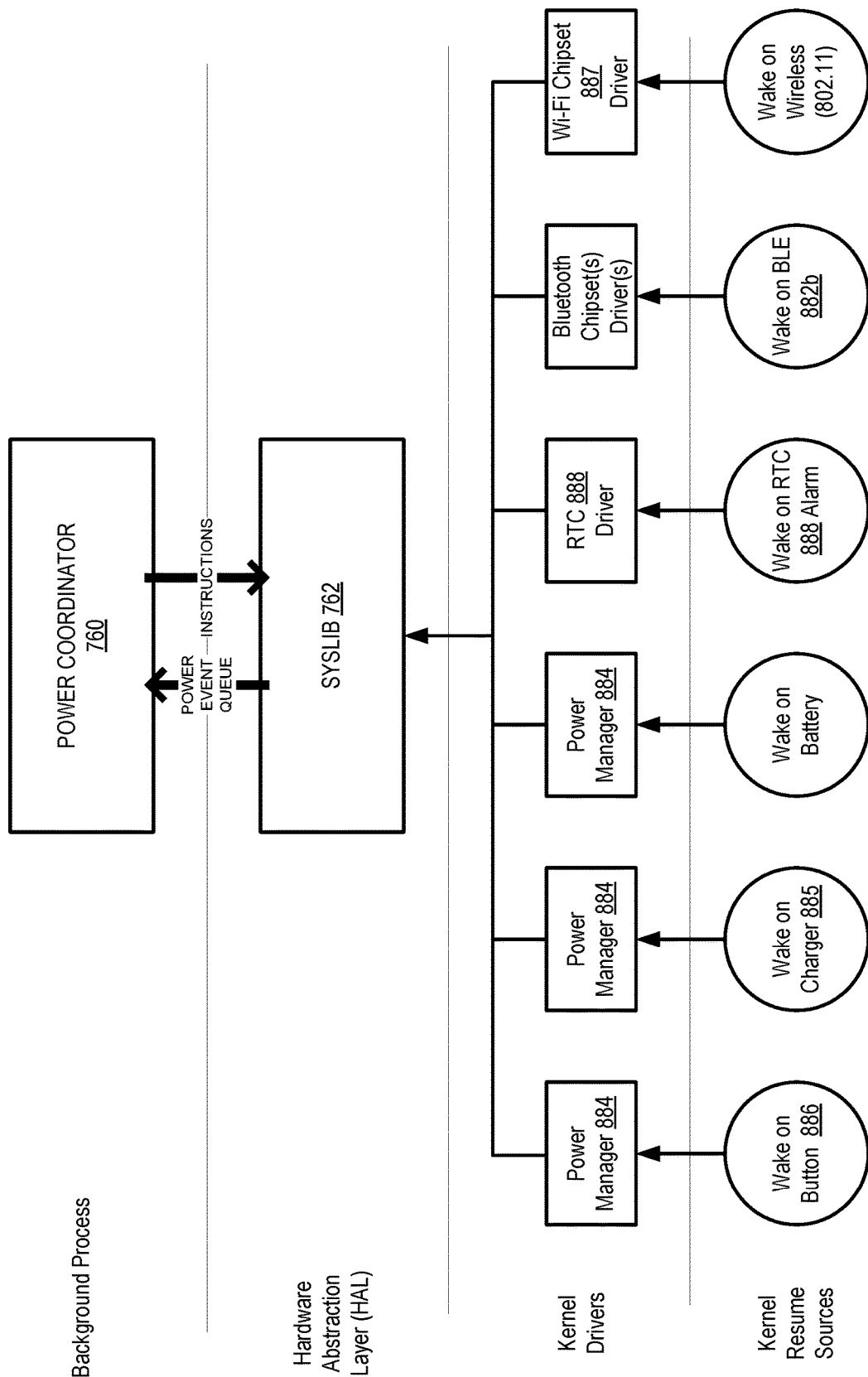
FIG. 8B is a block diagram showing an example hierarchy of components within an example portable playback device.

FIG. 8B is a block diagram showing an example hierarchy illustrating how the power coordinator 760 is notified of the source of kernel resume. On the lowest level of the hierarchy are example kernel resume sources, including a wake on-button 886, wake on charger 885, wake on battery (e.g., critical or fault), wake on RTC 888 alarm, wake on BLE 882b and wake on wireless. On the second level of the hierarchy are the kernel drivers that handle interrupts from each of the corresponding kernel resume sources and responsively wake the kernel. When the kernel is resumed, the syslib 762 adds a "resumed source event" power event to the power event queue. The "resumed source event" power event indicates the source of the kernel resume trigger. Once the power coordinator 760 is resumed, the power coordinator reads the power event queue to determine the source of the kernel resume. As noted above, the power coordinator 760 may notify the client programs 761 of the source of the kernel resume via the IPC mechanisms.

Figures 9A, 9B, 9C:
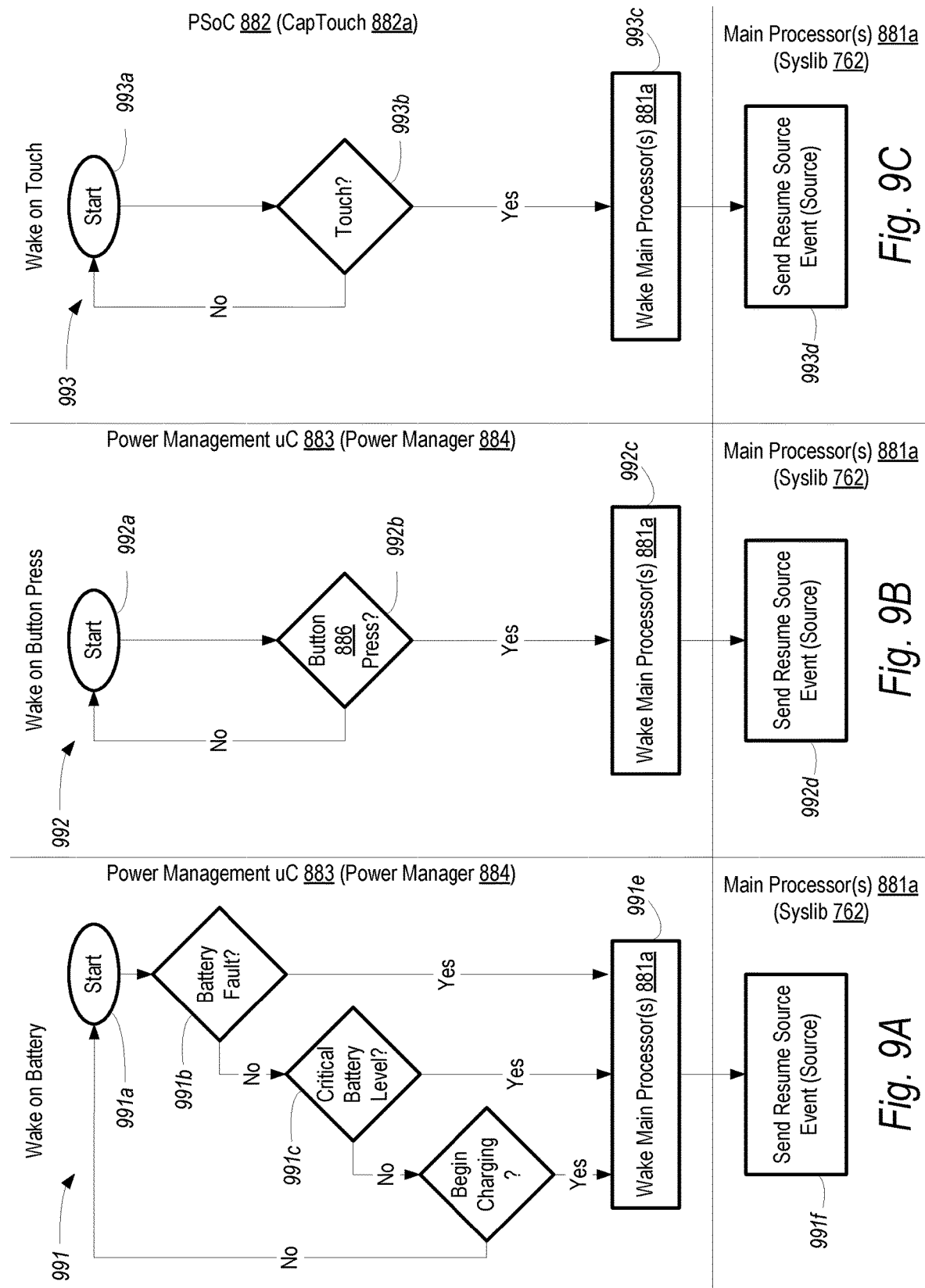
FIGS. 9A, 9B, 9C, 9D, 9E, and 9F are example flow diagrams illustrating example wake trigger detection in accordance with aspects of the disclosed technology.

FIG. 9A is a flow diagram illustrating an example method 991 to facilitate wake-on-battery. The method 991 begins at 991a with the power manager 884 executing on the power management uC 883. At this time, the kernel is suspended (which places the main processors 881a in a suspended (e.g., power gated) state).

At 991b, the power manager 884 determines whether a battery fault has occurred. Battery faults may occur for various reasons, such as battery dead or overheating. The power management uC 883 includes various sensors to detect a battery fault, such as voltage, current, and/or temperature sensors, among others. If a battery fault has occurred, the power manager 884 sends an interrupt to wake the main processor(s) 881a at 991e. If no battery fault has occurred, the method 991 continues to 991c.

At 991c, the power manager 884 determines whether the battery level of the batteries is at critical level (e.g., 1%). The power management uC 883 includes sensors to detect battery level, such as voltage and/or current sensors. If the batteries are at critical level, the power manager 884 sends an interrupt to wake the main processor(s) 881a at 991e. If no battery fault has occurred, the method 991 continues to 991d.

At 991d, the power manager 884 determines whether the batteries have begun charging. The power management uC 883 includes one or more sensors to monitor charging status. If the batteries have started charging, the power manager 884 sends an interrupt to wake the main processor(s) 881a at 991e. If the charging status has not changed, the method 991 continues back to 991a.

After the main processor(s) 881 are woken up at 991a, the kernel resumes. At 991f, Syslib 762 executing on the main processor(s) 881 sends a resume source power event indicating the source of the resume (e.g., wake on battery fault/critical battery level/begin charging) to the power event queue. Then, when the power coordinator 760 resumes, the power coordinator 760 can read the power event queue to determine the source of the kernel resume, as discussed above.

FIG. 9B is a flow diagram illustrating an example method 992 to facilitate wake on button press. The method 992 begins at 992a with the power manager 884 executing on the power management uC 883. At this time, the kernel is suspended (which places the main processors 881*a* in a suspended (e.g., power gated) state).

At 992*b*, the power manager 884 determines whether the button 886 has been pressed (e.g., the power button 313*a* (FIG. 3C)). If the button 886 has been pressed in the programmed manner, the power manager 884 sends an interrupt to wake the main processor(s) 881*a* at 992*c*. If not, the method 992 continues back to 992*a*.

In an example, the button 886 may be connected to the power management uC 883 via a circuit. Actuation of the button 886 may close or open the circuit. The power manager 884 monitors the status of this circuit to detect button presses. Further, in some implementations, the power manager 884 may differentiate between button presses of different lengths. For instance, a short press may be less than one second while a long press is greater than one second. In an example, the short press is programmed to wake-up while the long press is programmed to toggle power on or off.

After the main processor(s) 881 are woken up at 992*c*, the kernel resumes. At 992*d*, Syslib 762 executing on the main processor(s) 881 sends a resume source power event indicating the source of the resume (i.e., button press) to the power event queue. Then, when the power coordinator 760 resumes, the power coordinator 760 can read the power event queue to determine the source of the kernel resume, as discussed above.

FIG. 9C is a flow diagram illustrating an example method 993 to facilitate wake on capacitive touch. The method 993 begins at 993*a* with the CapTouch 882*a* driver executing on the PSoC 882*a*. At this time, the kernel is suspended (which places the main processors 881*a* in a suspended (e.g., power gated) state).

At 993*b*, the CapTouch 882*a* driver determines whether a capacitive touch input has been received. As described above, during kernel suspend, the CapTouch 882*a* may operate in various modes, such as a first sleep mode where the capacitive touch portions of the user interface 313 are ganged together to form a single proximity detector or a second sleep mode where only one capacitive touch portion of the user interface 313 is enabled. Alternatively, during kernel suspend, the PSoC remains fully active to detect capacitive touch input via the control surfaces of the user interface 313. If capacitive touch input has been received, the CapTouch 882*a* driver sends an interrupt to wake the main processor(s) 881*a* at 993*c*. If not, the method 993 continues back to 993*a*.

After the main processor(s) 881 are woken up at 993*c*, the kernel resumes. At 993*d*, Syslib 762 executing on the main processor(s) 881 sends a resume source power event indicating the source of the resume (i.e., capacitive touch) to the power event queue. Then, when the power coordinator 760 resumes, the power coordinator 760 can read the power event queue to determine the source of the kernel resume, as discussed above.

Figures 9D, 9E, 9F:
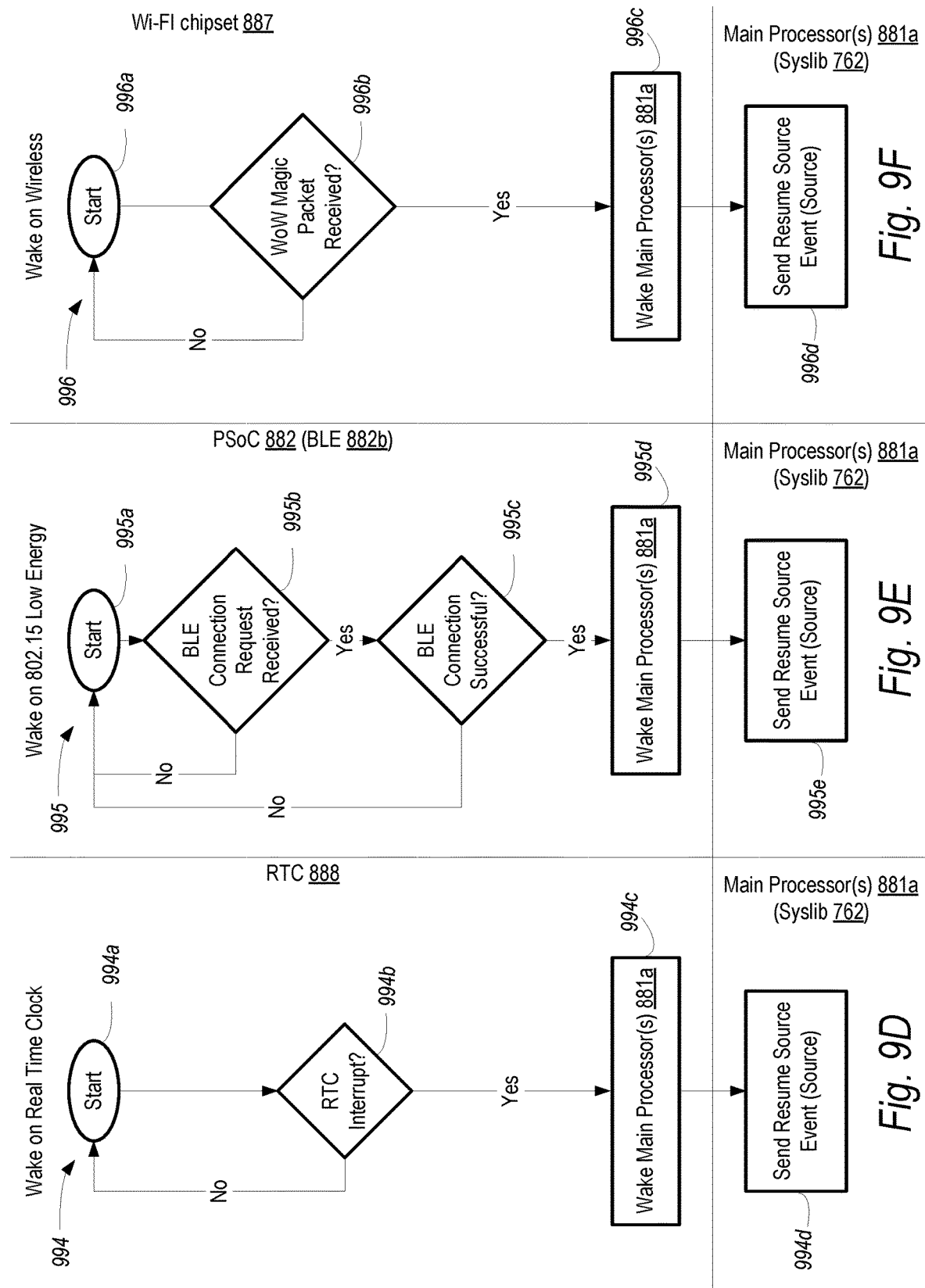

FIG. 9D is a flow diagram illustrating an example method 994 to facilitate wake on real time clock. The method 994 begins at 994*a* with the RTC 888 driver executing. At this time, the kernel is suspended (which places the main processors 881*a* in a suspended (e.g., power gated) state).

At 994*b*, the RTC 888 driver determines whether an RTC interrupt has been generated. As indicated above, the RTC 888 driver may generate an RTC interrupt when at certain times. For instance, the RTC 888 driver may generate an RTC interrupt at expiration of the kernel suspend timeout trigger, which is set by the power coordinator 760 via the syslib 762. As another example, the RTC 888 driver may generate an RTC interrupt at a time corresponding to an alarm, which may be set via a client program, such as client program 761*a*. If the RTC interrupt has been generated, the RTC 888 driver sends an interrupt to wake the main processor(s) 881*a* at 994*c*. If not, the method 994 continues back to 994*a*.

After the main processor(s) 881 are woken up at 994*c*, the kernel resumes. At 994*d*, Syslib 762 executing on the main processor(s) 881 sends a resume source power event indicating the source of the resume (i.e., RTC interrupt) to the power event queue. Then, when the power coordinator 760 resumes, the power coordinator 760 can read the power event queue to determine the source of the kernel resume, as discussed above.

FIG. 9E is a flow diagram illustrating an example method 995 to facilitate wake on Bluetooth Low Energy. The method 995 begins at 995*a* with the BLE 882*b* driver executing on the PSoC 882. At this time, the kernel is suspended (which places the main processors 881*a* in a suspended (e.g., power gated) state).

At 995*b*, the BLE 882*b* driver determines whether a BLE connection request has been received. If the BLE connection request has not been received, the method 995 continues back to 995*a*. If the BLE connection request has been received, at 995*c*, the BLE 882*b* driver determines whether the BLE connection has been successful. If the BLE connection request was not successful, the method 995 continues back to 995*a*. If the BLE connection was successful, the BLE 882*b* driver sends an interrupt to wake the main processor(s) 881*a* at 995*d*.

After the main processor(s) 881 are woken up at 995*d*, the kernel resumes. At 995*e*, Syslib 762 executing on the main processor(s) 881 sends a resume source power event indicating the source of the resume (i.e., wake on BLE) to the power event queue. Then, when the power coordinator 760 resumes, the power coordinator 760 can read the power event queue to determine the source of the kernel resume, as discussed above.

FIG. 9F is a flow diagram illustrating an example method 996 to facilitate wake on wireless. The method 996 begins at 996*a* with the Wi-Fi chipset 887 driver executing on the Wi-Fi chipset 887. At this time, the kernel is suspended (which places the main processors 881*a* in a suspended (e.g., power gated) state).

At 996*b*, the Wi-Fi chipset 887 driver determines whether a wake-on-wireless (WoW) magic packet has been received. If the WoW magic packet has been received, the Wi-Fi chipset 887 driver sends an interrupt to wake the main processor(s) 881*a* at 996*c*. If not, the method 996 continues back to 996*a*.

After the main processor(s) 881 are woken up at 996*c*, the kernel resumes. At 996*d*, Syslib 762 executing on the main processor(s) 881 sends a resume source power event indicating the source of the resume (i.e., WoW) to the power event queue. Then, when the power coordinator 760 resumes, the power coordinator 760 can read the power event queue to determine the source of the kernel resume, as discussed above.

FIG. 10 is a table illustrating example power modes of the portable playback device 310 as well as example status' of the various components of the portable playback device 310 in each power mode. These power modes are provided for purposes of illustration. Various embodiments may include additional or fewer power modes, different power modes, or different status of the various components of the portable playback device 310 in each power mode.

In the "Dead Battery/Shipping Power" mode, the power manager 884 has switched a battery discharged protection switch to open, which fully disconnects the battery from the electronics 312 of the portable playback device 310. As shown in FIG. 10, the components of the portable playback device 310 are all off. Once the charger 885 is connected, the power manager 884 will begin executing and transition the portable playback device 310 to "Off" mode.

In the "Off" mode, the portable playback device 310 is awaiting a button 886 press (e.g., a long press) to initiate BOOT of the kernel to transition to "Standby" mode. As shown in FIG. 10, the power management uC 883 is active in "Off" mode, which allows the power manager 884 to execute. Other components are disabled.

In the "Standby" mode, the portable playback device 310 has an active wireless connection (to receive network communications from the control device 130 and/or the playback device(s) 110) but no audio is playing. Certain components are active to support kernel resume triggers. If "Standby" mode persists for a pre-determined period of time (e.g., 20-30 minutes), the power manager 884 transitions the portable playback device into "Deep Sleep" mode to conserve battery.

In the "Deep Sleep" mode, the portable playback device 310 is waiting a button 886 press (e.g., a short press) to transition back to Standby mode. If "Deep Sleep" mode persists for a pre-determined period of time (e.g., 2-4 hours), the power manager 884 transitions the portable playback device into "Off" mode to conserve battery.

In "Playback" mode, the portable playback device 310 is playing audio. Most components are active to facilitate playback and associated operations, such as network-based audio streaming and control. As shown, the voice components (i.e., the NMD 320) are in low power state to conserve battery.

In "Charging" mode, the portable playback device 310 is connected to charger 885. Generally, components are active in "Charging" mode as power usage does not necessarily need to be minimized. If the charger 885 is disconnected, the power manager 885 transitions the portable playback device 310 to "Standby" mode.

In some implementations, in "Charging" mode, the portable playback device 310 operations in a zone of the media playback system 100. This zone is programmatically assigned using the control device 130 and is generally based on the location of the charging base 319. For instance, if the charging base 319 is located in the kitchen, the portable playback device 310 is generally assigned to the Kitchen zone.

VI. Example Power Coordination Techniques

Figure 11:
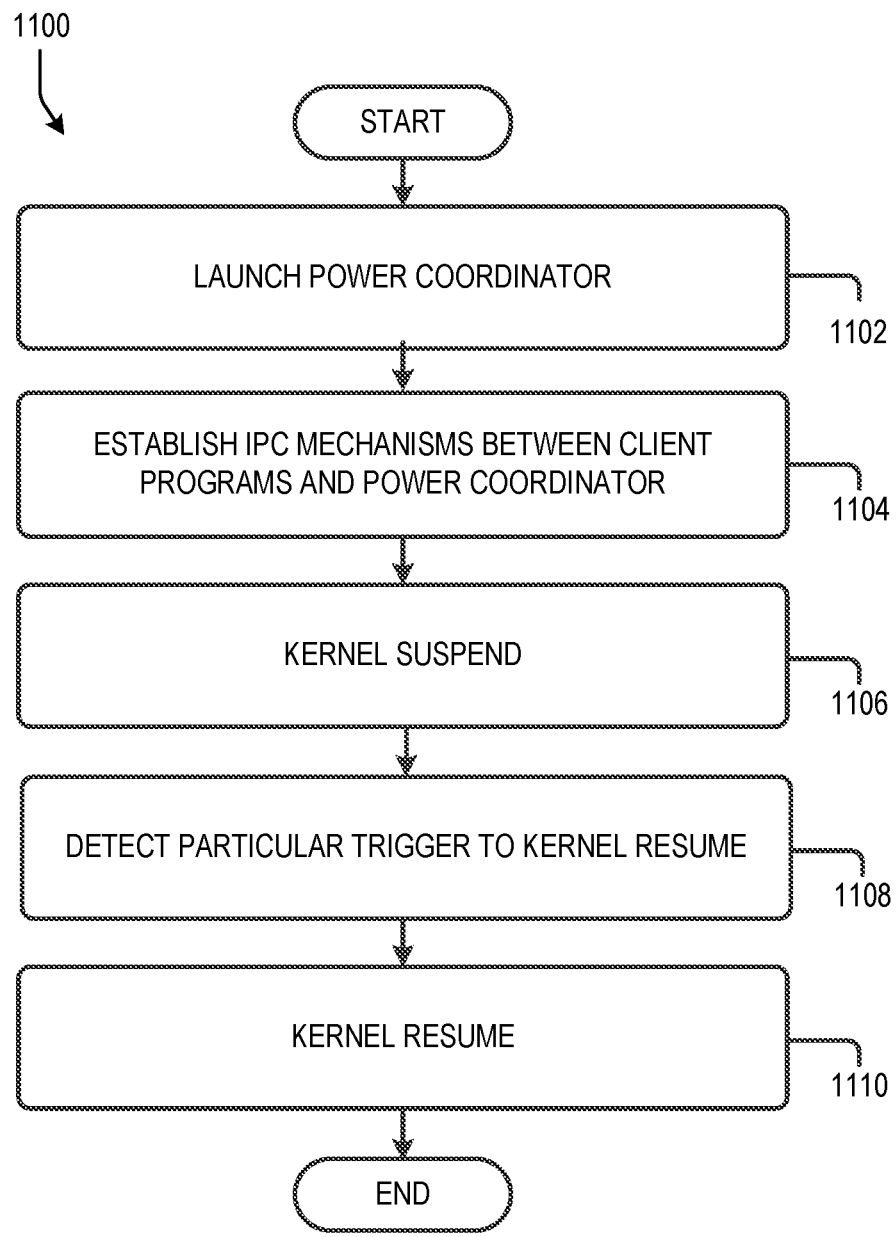
FIG. 11 is a flow diagram of an example method to facilitate power coordination in a portable playback device.

FIG. 11 is a flow diagram showing an example method 1100 to facilitate power coordination in a portable playback device, such as the portable playback device 310 (FIGS. 3A-3F).

At block 1102, the method 1100 includes launching a power coordinator. For example, the portable playback device 310 may launch the power coordinator 760 (FIG. 7A), which is a power coordinator background process having multiple client programs 761a-d. In some implementations, the kernel of the portable playback device 310 may launch (e.g., execute) the power coordinator 760 during the boot process or after a kernel resume following a kernel suspend, among other instances.

As described above, the multiple client programs 761a-d may include programs configured to manage various functionality of the portable playback device 310. In an example, the client programs 761a-d include comprise a control program that configures the playback device to play back audio via the one or more speakers and the one or more amplifiers, a network manager program, an update manager program, and a Bluetooth manager program. Other examples are possible as well.

At block 1104, the method 1100 includes establishing inter-process communication (IPC) mechanisms between the multiple client programs and the power coordinator. For instance, as shown in FIG. 7A, the power coordinator 760 may establish respective IPC mechanisms between the power coordinator 760 the multiple client programs 761a-d. In example implementations, an IPC mechanism may include one or more sockets 763 and/or shared memory 764 (FIG. 7B). Other types of IPC mechanisms may be suitable as well.

At block 1106, the method 1100 includes performing a kernel suspend. During a kernel suspend, the portable playback device 310 may disable one or more processors and/or decrease frequency of certain processors. For instance, the kernel may be configured to execute on the main processor(s) 881a of the SoC 881 (FIG. 8A). To kernel suspend, the kernel may send instructions to the power manager 884 to disable the main processor(s) 881a.

Within example implementations, the power manager 760 may determine when to kernel suspend based on input from the multiple client processes 761. For instance, the power manager 760 may implement the example kernel suspend technique. (FIGS. 7C and 7D). In alternative implementations, the power manager 760 may implement another suitable algorithm.

As noted above, the example kernel suspend technique may involve the power manager 760 receiving, via the established IPC mechanisms from the multiple client programs 761, messages indicating (a) that the respective client program 761a-d is ready to suspend and (b) a respective resume time. The kernel suspend technique further involves determining, based on the received messages from the multiple client programs 761, that each client program 761a-d of the multiple client programs 761 is ready to suspend. Based on determining that each client program 761a-d of the multiple client programs 761 is ready to suspend, the power manager 760 sends, via the established IPC mechanisms to the multiple client programs 761, respective messages indicating that kernel suspend is imminent and then waits a pre-determined time period from sending the respective messages indicating that kernel suspend is imminent. When each client program 761a-d of the multiple client programs 761 is ready to suspend after the pre-determined time period, the power manager 760 sends the instructions to the operating system to kernel suspend (e.g., via the syslib 762). The power manager 760 may also set a kernel suspend timeout trigger to the earliest resume time among the resume times indicated in the received messages from the multiple client programs.

In further examples, the power coordinator 760 may estimate a resume time based on a usage history of the playback device. Such an estimation may prevent an unnecessary or inefficient short suspend, as the power coordinator 760 may determine not to kernel suspend (even if all clients are ready to suspend) if the estimated system resume time is not at least a threshold period of time in advance of the current time. Further the portable playback device 310 may alter the pre-determined period of times for waiting after the suspend imminent, or to transition between power modes, based on the usage history. For instance, if the portable playback device is frequency woken up via button press after going to "Deep Sleep" (FIG. 10), the portable playback device 310 may lengthen the pre-determined period of time to wait in "Standby" before going to "Deep Sleep." Other examples are possible as well.

Each client program 761a-d may determine that its ready to suspend based on its own functions. For instance, a network manager client program or a Bluetooth manager client program may determine that the IEEE 802.11-compatible or 802.15-compatible interface is idle. Such a program may also determine (e.g., estimate) a time that the corresponding interface is expected to receive transmissions (e.g., packets) based on scheduled operations, historical usage data, or other factors. Based on such determinations, the client program may send the power manager 760, one or more messages indicating (i) that the client program is ready to suspend and (ii) a resume time that is a pre-determined period of time before the estimated time that the corresponding interface is expected to receive transmissions.

As another example, an update manager client program may determine that no updates available from one or more servers (e.g., the computing devices 106 (FIG. 1B)) and/or updates are scheduled at a certain update time. Based on this determination, the update client manager may send, to the power manager 760 via the established IPC mechanism, a message indicating (i) that the update manager program is ready to suspend and (ii) a resume time that is a particular period of time from a current time. The particular period may be a pre-determined period of time or a determined time based on the scheduled update time.

In another example, the control client program that configures the portable playback device 310 to play back audio may determine that no audio playback is ongoing or anticipated. The control client program may anticipate playback based on detecting user proximity (e.g., via a capacitive touch user interface) (FIG. 3D), based on scheduled playback (e.g., zone scenes or alarms), or based on incoming control instructions from the control device 120, among other examples. during audio playback, the control client program foregoes sending a message indicating that the messages indicating the control plane program is ready to suspend, as kernel suspend would interrupt the audio playback.

At block 1108, the method 1100 includes detecting a particular trigger to kernel resume. Example triggers to kernel resume include the kernel suspend timeout trigger (e.g., from the RTC 888), wake-on-button (e.g., from the button 886 via the power manager uC 883), wake-on-battery (e.g., via the power manager uC 883), wake-on-BLE or capacitive touch (e.g., form the CapTouch 882a or BLE 882b of the PSoC 882), and wake-on-wireless (e.g., via the Wi-Fi chipset 887) (FIGS. 8A and 8B). Example techniques to detect such triggers are described in FIGS. 9A-9F, as well as throughout the disclosure. Additional or alternative triggers may be implemented as well.

At block 1110, the method 1100 includes performing a kernel resume. For instance, the auxiliary processor 881b of the SoC 881 may receive an interrupt from a kernel resume source (FIGS. 8A and 8B) and resume the main processor(s) 881a and the kernel. Other examples are possible as well.

VII. Example Power Management Techniques

Figure 12:
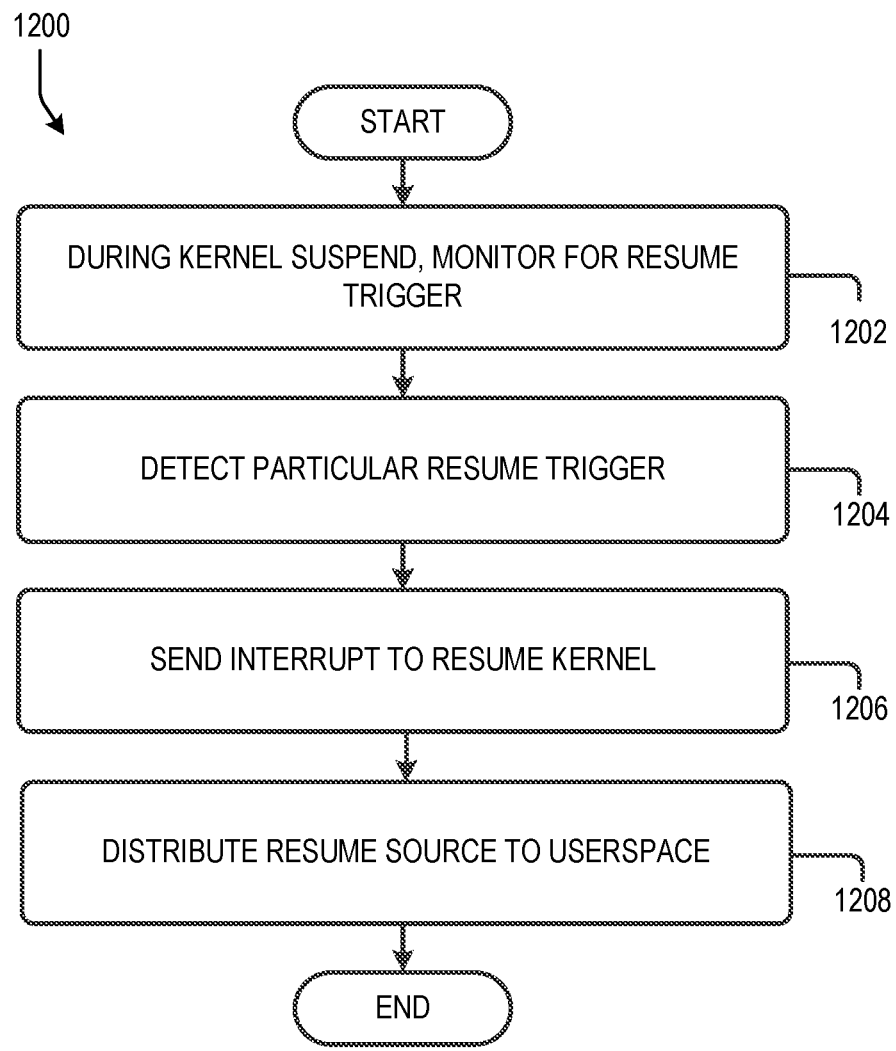
FIG. 12 is a flow diagram of an example method to facilitate power management in a portable playback device.

FIG. 12 is a flow diagram showing an example method 1200 to facilitate power management in a portable playback device, such as the portable playback device 310 (FIGS. 3A-3F).

At block 1202, the method 1200 involves monitoring for resume triggers during kernel suspend. As noted above, during kernel suspend, one or more main processors are in suspend mode (e.g., power-gated) and the kernel and userspace programs are not executing. Accordingly, one or more secondary controllers of the portable playback device 310 may monitor for appropriate conditions corresponding to multiple resume triggers.

Example resume triggers include wake-on-button (e.g., a power button, to facilitate the user requesting a resume), wake-on-battery (e.g., based on a fault or change in status), wake-on-Bluetooth, wake-on-wireless, and/or wake-on-touch. Example secondary controllers include the power management uC 883, the PSoC 882, and the Wi-Fi chipset 887 (FIG. 8A), among other examples. Such secondary controllers may monitor for such resume triggers using the example techniques illustrated in FIGS. 9A, 9B, 9C, 9D, 9E, and 9F, among other examples.

For instance, during kernel suspend, the power manager 884 may monitor, via one or more sensors of the power management uC 883, the battery for conditions corresponding to respective wake-on-battery triggers (FIG. 9A). Example wake-on-battery triggers include a battery fault, a critical battery level, and battery charging initiated. In further examples, the power manager 884 may monitor, via the one or more sensors of the power management uC 883, a circuit for a signal corresponding to a wake-on-button trigger (FIG. 9B). Such a signal may correspond to a press of the power button 313a (FIG. 3C).

As another example, the PSoC 882 may monitor for various resume triggers. For example, the CapTouch 882a driver may monitor a capacitive-touch user interface (e.g., control surfaces 313d-313g in FIG. 3D) for data indicating a wake-on-touch trigger (FIG. 9C). As another example, the BLE 882b driver may monitor, via an 802.15-compatible Bluetooth Low Energy (BLE) interface, for a wake-on-BLE trigger (FIG. 9E).

Another example involves the RTC 888 monitoring a clock of the RTC chipset for the kernel suspend triggers based on time (FIG. 9D). Example kernel suspend triggers based on time include the kernel suspend timeout trigger, alarms, and pre-programmed playback such as zone scenes. For instance, before kernel suspend of the kernel, the RTC 888 may receive, via the kernel, instructions from the power coordinator 760 to set a kernel suspend timeout trigger for a particular time and responsively set the kernel suspend timeout trigger.

In a further example, the Wi-Fi chipset 887 may monitor for a wake-on-wireless trigger (FIG. 9F). Monitoring for a wake-on-wireless trigger involve determining whether a wake-on-wireless magic packet has been received via the Wi-Fi chipset 887. Other examples are possible as well.

At block 1204, the method 1200 involves detecting a particular resume trigger. For instance, a given secondary controller may detect one of the example resume triggers, such as wake-on-button, wake-on-battery, wake-on-Bluetooth, wake-on-wireless, or wake-on-touch, among other examples. The example secondary controllers may monitor for such resume triggers using the example techniques illustrated in FIGS. 9A, 9B, 9C, 9D, 9E, and 9F, among other examples.

At block 1206, the method 1200 involves sending an interrupt to resume the kernel. For example, the secondary controller may sends an interrupt to an auxiliary processor 881b, which resumes the main processors 881a and the kernel in response to receiving the interrupt (FIG. 8A). Other examples are possible as well.

At block 1208, the method 1200 involves distributing resume source to userspace. Example userspace programs include the power coordinator 760 and the multiple client programs 761 (FIG. 7A). Other userspace programs are possible as well.

In an example, the syslib 762 of the kernel adds a kernel resume event to a power event queue (FIG. 7A). This kernel resume event indicates the source of the kernel resume. After resuming from suspend, the power coordinator 760 reads the kernel resume event from the power event queue. The power coordinator 760 may then send messages indicating the source of the kernel resume to the multiple client programs via the IPC mechanisms (FIGS. 7A and 7B).

VIII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method to be performed by a playback device, the method comprising: launching a power coordinator background process, the power coordinator background process having multiple client programs; establishing respective inter-process communication (IPC) mechanisms between the multiple client programs and the power coordinator background process; receiving, via the established IPC mechanisms from the multiple client programs, messages indicating (a) that the respective client program is ready to suspend and (b) a respective resume time; determining, based on the received messages from the multiple client programs, that each client program of the multiple client programs is ready to suspend; based on determining that each client program of the multiple client programs is ready to suspend, (i) sending instructions to the operating system to kernel suspend and (ii) setting a kernel suspend timeout trigger to the earliest resume time among the resume times indicated in the received messages from the multiple client programs; while in the kernel suspend, detecting a particular trigger to kernel resume from among a plurality of triggers to kernel resume, wherein the plurality of triggers to kernel resume comprise the kernel suspend timeout trigger; and in response to the detecting the particular trigger to kernel resume, performing a kernel resume.

Example 2: The method of Example 1, wherein the playback device is configured to operate in one of multiple power levels, the multiple power levels comprising a first power level and a second power level, the playback device consuming less power in the second power level relative to the first power level, and wherein the method further comprise: receiving, via the established IPC mechanisms from the multiple client programs, messages indicating respective power level requirements of the multiple client programs; determining, based on the received messages from the multiple client programs, a particular power level from among the multiple power levels, the particular power level being the highest power level among the respective power level requirements of the multiple client programs; and sending instructions to the operating system to operate at the particular power level.

Example 3: The method of Examples 2, wherein operating at the particular power level comprises at least one of (a) decreasing a frequency of at least one processor of the one or more processors or (b) disabling one or more cores of the at least one processor.

Example 4: The method of any one of Examples 1-3, further comprising: estimating a system resume time based on a usage history of the playback device, and determining that the estimated system resume time is at least a threshold period of time in advance of the current time, wherein sending instructions to the operating system to kernel suspend comprises sending instructions to the operating system to kernel suspend further based on determining that the estimated system resume time is at least the threshold period of time in advance of the current time.

Example 5: The method of any one of Examples 1-4, further comprising: based on determining that each client program the multiple client programs is ready to suspend, sending, via the established IPC mechanisms to the multiple client programs, respective messages indicating that kernel suspend is imminent; waiting a pre-determined time period from sending the respective messages indicating that kernel suspend is imminent; and when each client program of the multiple client programs is ready to suspend after the pre-determined time period, sending the instructions to the operating system to kernel suspend.

Example 6: The method of any one of Examples 1-5, wherein the particular trigger is a power button event, and wherein detecting the particular trigger to enter the first power mode comprises receiving, from the operating system, data indicating a power button event, the method further comprising: sending, via the established IPC mechanisms to the multiple client programs, respective messages indicating the power button event.

Example 7: The method of any one of Examples 1-6, wherein the particular trigger is a battery voltage level event, and wherein detecting the particular trigger to enter the first power mode comprises receiving, from the operating system, data indicating the battery voltage level event, the method further comprising: sending, via the established IPC mechanisms to the multiple client programs, respective messages indicating the battery voltage level event.

Example 8: The method of any one of Examples 1-7, wherein the particular trigger is a wake-on-wireless event, and wherein detecting the particular trigger to enter the first power mode comprises receiving, from the operating system, data indicating the wake-on-wireless event, the method further comprising: sending, via the established IPC mechanisms to the multiple client programs, respective messages indicating the wake-on-wireless event.

Example 9: The method of any one of Examples 1-8, wherein the multiple client programs comprise a network manager program, the method further comprising: determining, via the network manager program, that the IEEE 802.11-compatible network interface is idle; determining a time that the IEEE 802.11-compatible network interface is expected to receive packets; and based on determining that the IEEE 802.11-compatible network interface is idle, sending, via the established IPC mechanism, a message indicating (i) that the network manager program is ready to suspend and (ii) a resume time that is a pre-determined period of time before the determined time that the IEEE 802.11-compatible network interface is expected to receive packets.

Example 10: The method of any one of Examples 1-9, wherein the multiple client programs comprise an update manager program, the method further comprising: determining, via the update manager program, that no updates are scheduled; and based on determining that no updates are scheduled, sending, via the established IPC mechanism, a message indicating (i) that the update manager program is ready to suspend and (ii) a resume time that is a pre-determined period of time from a current time.

Example 11: The method of any one of Examples 1-10, wherein the multiple client programs comprise a control program that configures the playback device to play back audio via the one or more speakers and the one or more amplifiers, the method further comprising: during audio playback via the one or more speakers and the one or more amplifiers, foregoing sending a message indicating that the messages indicating the control plane program is ready to suspend.

Example 12: The method of any one of Examples 1-11, wherein the multiple client programs comprise a particular subset of client programs, the particular subset of client programs comprising a control program that configures the playback device to play back audio via the one or more speakers and the one or more amplifiers, the method further comprising: preventing kernel suspend when the respective IPC mechanisms between the particular subset of client programs and the power coordinator background process are disconnected.

Example 13: The method of any one of Examples 1-12, further comprising: receiving, from the operating system, charge state event data indicating a charge state of the battery, the charge state comprising one of: (a) the battery is connected to a charging source or (b) the battery is disconnected from the charging source; sending, via the established IPC mechanisms to the multiple client programs, messages indicating the charge state of the battery; and receiving, via the established IPC mechanisms from a given client program, a message indicating that the given client program is ready to suspend and a given resume time, wherein the given client program determines the given resume time based on the charge state.

Example 14: A playback device comprising a control interface comprising a power button and transport controls; one or more speakers; one or more amplifiers configured to drive the one or more speakers; a battery; communications interfaces comprising an IEEE 802.11-compatible network interface and an IEEE 802.15-compatible interface; one or more processors; and a housing carrying the one or more speakers, the one or more amplifiers, the battery, the communications interfaces, the one or more processors, and data storage having stored thereon (i) an operating system configured to kernel suspend and resume and (ii) instructions that are executable by the one or more processors to cause the playback device to perform the method of any of Examples 1-13.

Example 15: A tangible, non-transitory, computer-readable medium having instructions stored thereon that are executable by one or more processors to cause a playback device to perform the method of any one of Examples 1-13.

Example 16: A portable playback device comprising: a control interface comprising a power button and transport controls; one or more speakers; one or more amplifiers configured to drive the one or more speakers; a battery; communications interfaces comprising an IEEE 802.11-compatible network interface and an IEEE 802.15-compatible interface; a main system-on-chip (SoC) comprising one or more main processor cores, an auxiliary processor core configured to enable the one or more main processor cores upon receiving an interrupt, and a kernel that executes on the one or more main processor cores, wherein a kernel suspend of the kernel disables the one or more main processor cores; a power management microcontroller configured to perform functions comprising: during kernel suspend of the kernel, monitoring, via one or more sensors of the power management microcontroller, the battery for conditions corresponding to respective wake-on-battery triggers, wherein the wake-on-battery triggers comprise (i) a battery fault, (ii) a critical battery level, and (iii) battery charging initiated; detecting that the monitored conditions correspond to a particular wake-on-battery trigger; and in response to detecting that the monitored conditions correspond to particular wake-on-battery trigger, sending, to the auxiliary processor core, an interrupt corresponding to the particular wake-on-battery trigger, wherein the interrupt causes the auxiliary processor core to enable the one or more main processor cores and resume the kernel from kernel suspend; and a housing carrying the one or more speakers, the one or more amplifiers, the battery, the communications interfaces, the power management microcontroller, and the main SoC, wherein the kernel is configured to perform functions comprising: after resuming from kernel suspend, adding a first kernel resume source event to a power event queue, the first kernel resume source event indicating the particular wake-on-battery trigger, wherein a power coordinator background process is configured to read the first kernel resume source event from the power event queue and send data indicating the particular wake-on-battery trigger to one or more client programs via one or more inter-process communication (IPC) mechanisms.

Example 17: The portable playback device of Example 16: wherein the power management microcontroller is configured to perform functions further comprising: during kernel suspend of the kernel, monitoring, via the one or more sensors of the power management microcontroller, a circuit for a signal corresponding to a wake-on-button trigger, the signal indicating a press of the power button; detecting that the monitored circuit has received the signal corresponding to the wake-on-button trigger; and in response to detecting that the monitored circuit has received the signal corresponding to the wake-on-button trigger, sending, to the auxiliary processor core, an interrupt corresponding to the wake-on-button trigger, wherein the interrupt causes corresponding to the wake-on-button trigger the auxiliary processor core to enable the one or more main processor cores and resume the kernel from kernel suspend.

Example 18: The portable playback device of any one of Examples 16-17: wherein the portable playback device further comprises a secondary SoC configured to perform functions comprising: during kernel suspend of the kernel, monitoring, via an 802.15-compatible Bluetooth Low Energy (BLE) interface, for a wake-on-BLE trigger, wherein monitoring for the wake-on-BLE trigger comprises (i) determining whether a BLE connection request has been received and (ii) after receiving the BLE connection request, determining whether a BLE connection was successful; and in response to determining that the BLE connection was successful, sending, to the auxiliary processor core, an interrupt corresponding to the wake-on-BLE trigger, wherein the interrupt corresponding to the wake-on-BLE trigger causes the auxiliary processor core to enable the one or more main processor cores and resume the kernel from kernel suspend.

Example 19: The portable playback device of any one of Examples 16-18: wherein the power coordinator background process is configured to read a second kernel resume source event from the power event queue, the second kernel resume source event indicating the wake-on-BLE trigger and send data indicating the wake-on-BLE trigger to the one or more client programs via the one or more inter-process communication (IPC) mechanisms, and wherein a first client program changes a playback source of the portable playback device to the BLE connection in response to receiving the data indicating the wake-on-BLE trigger.

Example 20: The portable playback device of any one of Examples 16-19: wherein the playback device further comprises a capacitive-touch user interface comprising the transport controls, and wherein the secondary SoC configured to perform functions further comprising: during kernel suspend of the kernel, monitoring the capacitive-touch user interface for data indicating a wake-on-touch trigger; determining that the monitored capacitive-touch user interface has received a capacitive touch corresponding to the wake-on-touch trigger; and in response to determining that the monitored capacitive-touch user interface has received a capacitive touch corresponding to the wake-on-touch trigger, sending, to the auxiliary processor core, an interrupt corresponding to the wake-on-touch trigger, wherein the interrupt corresponding to the wake-on-touch trigger causes the auxiliary processor core to enable the one or more main processor cores and resume the kernel from kernel suspend.

Example 21: The portable playback device of any one of Examples 16-20: wherein the portable playback device further comprises an 802.11-compatible Wi-Fi chipset configured to perform functions comprising: during kernel suspend of the kernel, monitoring, via the 802.11-compatible Wi-Fi chipset, for a wake-on-wireless trigger, wherein monitoring for the wake-on-wireless trigger determining whether a wake-on-wireless magic packet has been received via the 802.11-compatible Wi-Fi chipset; and in response to determining that the wake-on-wireless magic packet has been received via the 802.11-compatible Wi-Fi chipset, sending, to the auxiliary processor core, an interrupt corresponding to the wake-on-wireless trigger, wherein the interrupt corresponding to the wake-on-wireless trigger causes the auxiliary processor core to enable the one or more main processor cores and resume the kernel from kernel suspend.

Example 22: The portable playback device of any one of Examples 16-21: wherein the portable playback device further comprises a real time clock (RTC) chipset configured to perform operations comprising: before kernel suspend of the kernel, receiving, via the kernel, instructions from the power coordinator background process to set a kernel suspend timeout trigger for a particular time; in response to receiving instructions from the power coordinator background process to set the kernel suspend timeout trigger for the particular time, setting the kernel suspend timeout trigger for the particular time; during kernel suspend of the kernel, monitoring a clock of the RTC chipset for the kernel suspend timeout trigger; determining that the monitored clock of the RTC chipset indicates the particular time; and in response to determining that the monitored clock of the RTC chipset indicates the particular time, sending, to the auxiliary processor core, an interrupt corresponding to the kernel suspend timeout trigger, wherein the interrupt corresponding to the kernel suspend timeout trigger causes the auxiliary processor core to enable the one or more main processor cores and resume the kernel from kernel suspend.

Example 23: The portable playback device of any one of Examples 16-22: wherein the particular wake-on-battery trigger is the battery fault, and wherein detecting that the monitored conditions correspond to the particular wake-on-battery trigger comprises: detecting, via the one or more sensors of the power management microcontroller, data indicating that (a) a battery charge level of the battery has decreased below a minimum threshold for operating the portable playback device or (b) a temperature of the battery has exceeded a maximum operating temperature.

Example 24: The portable playback device of any one of Examples 16-23: wherein the particular wake-on-battery trigger is the critical battery level, and wherein detecting that the monitored conditions correspond to the particular wake-on-battery trigger comprises: detecting, via one or more sensors of the power management microcontroller, that a battery charge level of the battery has decreased below the critical battery level.

Example 25: The portable playback device of any one of Examples 16-24: wherein the particular wake-on-battery trigger is battery charging initiated, and wherein detecting that the monitored conditions correspond to the particular wake-on-battery trigger comprises: detecting, via one or more sensors of the power management microcontroller, one or more of (a) that a battery charge level of the battery is increasing, (b) the portable playback device has been placed upon a charging base, or (c) that a charging cable has been connected to a port of the portable playback device.

Example 26: A method to perform the functions of the portable playback device of any one of Examples 16-25.

Example 27: A tangible, non-transitory, computer-readable medium having instructions stored thereon that are executable by one or more processors to cause a portable playback device to perform the functions of any one of Examples 16-25.

The invention claimed is:

1. A playback device comprising:
a control interface comprising a power button and transport controls;
one or more speakers;
one or more amplifiers configured to drive the one or more speakers;
a battery;
communications interfaces comprising an IEEE 802.11-compatible network interface and an IEEE 802.15-compatible interface;
one or more processors; and
a housing carrying the one or more speakers, the one or more amplifiers, the battery, the communications interfaces, the one or more processors, and data storage having stored thereon (i) an operating system configured to kernel suspend and resume and (ii) instructions that are executable by the one or more processors to cause the playback device to perform functions comprising:
launching a power coordinator background process, the power coordinator background process having multiple client programs;
establishing respective inter-process communication (IPC) mechanisms between the multiple client programs and the power coordinator background process;
receiving, via the established IPC mechanisms from the multiple client programs, messages indicating (a) that the respective client program is ready to suspend and (b) a respective resume time;
determining, based on the received messages from the multiple client programs, that each client program of the multiple client programs is ready to suspend;
based on determining that each client program of the multiple client programs is ready to suspend, (i) sending instructions to the operating system to kernel suspend and (ii) setting a kernel suspend timeout trigger to the earliest resume time among the resume times indicated in the received messages from the multiple client programs;
while in the kernel suspend, detecting a particular trigger to kernel resume from among a plurality of triggers to kernel resume, wherein the plurality of triggers to kernel resume comprise the kernel suspend timeout trigger; and
in response to the detecting the particular trigger to kernel resume, performing a kernel resume.

2. The playback device of claim 1, wherein the playback device is configured to operate in one of multiple power levels, the multiple power levels comprising a first power level and a second power level, the playback device consuming less power in the second power level relative to the first power level, and wherein the functions further comprise:
receiving, via the established IPC mechanisms from the multiple client programs, messages indicating respective power level requirements of the multiple client programs;
determining, based on the received messages from the multiple client programs, a particular power level from among the multiple power levels, the particular power level being the highest power level among the respective power level requirements of the multiple client programs; and
sending instructions to the operating system to operate at the particular power level.

3. The playback device of claim 2, wherein operating at the particular power level comprises at least one of (a) decreasing a frequency of at least one processor of the one or more processors or (b) disabling one or more cores of the one or more processors.

4. The playback device of claim 1, wherein the functions further comprise:
estimating a system resume time based on a usage history of the playback device, and determining that the estimated system resume time is at least a threshold period of time in advance of the current time, wherein sending instructions to the operating system to kernel suspend comprises sending instructions to the operating system to kernel suspend further based on determining that the estimated system resume time is at least the threshold period of time in advance of the current time.

5. The playback device of claim 1, wherein the functions further comprise:
based on determining that each client program the multiple client programs is ready to suspend, sending, via the established IPC mechanisms to the multiple client programs, respective messages indicating that kernel suspend is imminent;
waiting a pre-determined time period from sending the respective messages indicating that kernel suspend is imminent; and
when each client program of the multiple client programs is ready to suspend after the pre-determined time period, sending the instructions to the operating system to kernel suspend.

6. The playback device of claim 1, wherein the particular trigger is a power button event, and wherein detecting the particular trigger to kernel resume comprises receiving, from the operating system, data indicating a power button event, and wherein the functions further comprise:
sending, via the established IPC mechanisms to the multiple client programs, respective messages indicating the power button event.

7. The playback device of claim 1, wherein the particular trigger is a battery voltage level event, and wherein detecting the particular trigger to kernel resume comprises receiving, from the operating system, data indicating the battery voltage level event, and wherein the functions further comprise:
sending, via the established IPC mechanisms to the multiple client programs, respective messages indicating the battery voltage level event.

8. The playback device of claim 1, wherein the particular trigger is a wake-on-wireless event, and wherein detecting the particular trigger to kernel resume comprises receiving, from the operating system, data indicating the wake-on-wireless event, and wherein the functions further comprise:
sending, via the established IPC mechanisms to the multiple client programs, respective messages indicating the wake-on-wireless event.

9. The playback device of claim 1, wherein the multiple client programs comprise a network manager program, and wherein the functions further comprise:
determining, via the network manager program, that the IEEE 802.11-compatible network interface is idle;
determining a time that the IEEE 802.11-compatible network interface is expected to receive packets; and
based on determining that the IEEE 802.11-compatible network interface is idle, sending, via the established IPC mechanism, a message indicating (i) that the network manager program is ready to suspend and (ii) a resume time that is a pre-determined period of time before the determined time that the IEEE 802.11-compatible network interface is expected to receive packets.

10. The playback device of claim 1, wherein the multiple client programs comprise an update manager program, and wherein the functions further comprise:
determining, via the update manager program, that no updates are scheduled; and
based on determining that no updates are scheduled, sending, via the established IPC mechanism, a message indicating (i) that the update manager program is ready to suspend and (ii) a resume time that is a pre-determined period of time from a current time.

11. The playback device of claim 1, wherein the multiple client programs comprise a control program that configures the playback device to play back audio via the one or more speakers and the one or more amplifiers, and wherein the functions further comprise:

during audio playback via the one or more speakers and the one or more amplifiers, foregoing sending a message indicating that the messages indicating the control program is ready to suspend.

12. The playback device of claim 1, wherein the multiple client programs comprise a particular subset of client programs, the particular subset of client programs comprising a control program that configures the playback device to play back audio via the one or more speakers and the one or more amplifiers, and wherein the functions further comprise:

preventing kernel suspend when the respective IPC mechanisms between the particular subset of client programs and the power coordinator background process are disconnected.

13. The playback device of claim 1, wherein the functions further comprise:

receiving, from the operating system, charge state event data indicating a charge state of the battery, the charge state comprising one of: (a) the battery is connected to a charging source or (b) the battery is disconnected from the charging source;

sending, via the established IPC mechanisms to the multiple client programs, messages indicating the charge state of the battery; and receiving, via the established IPC mechanisms from a given client program, a message indicating that the given client program is ready to suspend and a given resume time, wherein the given client program determines the given resume time based on the charge state.

14. A method to be performed by a portable playback device, the method comprising:

launching a power coordinator background process, the power coordinator background process having multiple client programs;

establishing respective inter-process communication (IPC) mechanisms between the multiple client programs and the power coordinator background process;

receiving, via the established IPC mechanisms from the multiple client programs, messages indicating (a) that the respective client program is ready to suspend and (b) a respective resume time;

determining, based on the received messages from the multiple client programs, that each client program of the multiple client programs is ready to suspend;

based on determining that each client program of the multiple client programs is ready to suspend, (i) sending instructions to an operating system to kernel suspend and (ii) setting a kernel suspend timeout trigger to the earliest resume time among the resume times indicated in the received messages from the multiple client programs;

while in the kernel suspend, detecting a particular trigger to kernel resume from among a plurality of triggers to kernel resume, wherein the plurality of triggers to kernel resume comprise the kernel suspend timeout trigger; and in response to the detecting the particular trigger to kernel resume, performing a kernel resume.

15. The method of claim 14, wherein the portable playback device is configured to operate in one of multiple power levels, the multiple power levels comprising a first power level and a second power level, the portable playback device consuming less power in the second power level relative to the first power level, and wherein the method further comprises:

receiving, via the established IPC mechanisms from the multiple client programs, messages indicating respective power level requirements of the multiple client programs;

determining, based on the received messages from the multiple client programs, a particular power level from among the multiple power levels, the particular power level being the highest power level among the respective power level requirements of the multiple client programs; and sending instructions to the operating system to operate at the particular power level.

16. The method of claim 14, further comprising:

based on determining that each client program the multiple client programs is ready to suspend, sending, via the established IPC mechanisms to the multiple client programs, respective messages indicating that kernel suspend is imminent;

waiting a pre-determined time period from sending the respective messages indicating that kernel suspend is imminent; and when each client program of the multiple client programs is ready to suspend after the pre-determined time period, sending the instructions to the operating system to kernel suspend.

17. The method of claim 14, wherein the multiple client programs comprise a network manager program, and wherein the method further comprises:

determining, via the network manager program, that a IEEE 802.11-compatible network interface is idle;

determining a time that the IEEE 802.11-compatible network interface is expected to receive packets; and based on determining that the IEEE 802.11-compatible network interface is idle, sending, via the established IPC mechanism, a message indicating (i) that the network manager program is ready to suspend and (ii) a resume time that is a pre-determined period of time before the determined time that the IEEE 802.11-compatible network interface is expected to receive packets.

18. The method of claim 14, wherein the multiple client programs comprise a particular subset of client programs, the particular subset of client programs comprising a control program that configures the portable playback device to play back audio via the one or more speakers and one or more amplifiers, and wherein the method further comprises:

preventing kernel suspend when the respective IPC mechanisms between the particular subset of client programs and the power coordinator background process are disconnected.

19. A tangible, non-transitory computer-readable medium having instructions encoded therein, wherein the instructions, when executed by one or more processors, cause a first playback device to perform a method comprising:

launching a power coordinator background process, the power coordinator background process having multiple client programs;

establishing respective inter-process communication (IPC) mechanisms between the multiple client programs and the power coordinator background process;

receiving, via the established IPC mechanisms from the multiple client programs, messages indicating (a) that the respective client program is ready to suspend and (b) a respective resume time;

determining, based on the received messages from the multiple client programs, that each client program of the multiple client programs is ready to suspend;

based on determining that each client program of the multiple client programs is ready to suspend, (i) sending instructions to the operating system to kernel suspend and (ii) setting a kernel suspend timeout trigger to the earliest resume time among the resume times indicated in the received messages from the multiple client programs;

while in the kernel suspend, detecting a particular trigger to kernel resume from among a plurality of triggers to kernel resume, wherein the plurality of triggers to kernel resume comprise the kernel suspend timeout trigger; and in response to the detecting the particular trigger to kernel resume, performing a kernel resume.

\* \* \* \* \*